(12) United States Patent
Bedrax-Weiss et al.

(10) Patent No.: US 8,103,676 B2
(45) Date of Patent: Jan. 24, 2012

(54) CLASSIFYING SEARCH RESULTS TO DETERMINE PAGE ELEMENTS

(75) Inventors: Tania Bedrax-Weiss, Sunnyvale, CA (US); Ramanthan Guha, Los Altos, CA (US); Patrick Riley, Palo Alto, CA (US); Corin Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 772 days.

(21) Appl. No.: 11/870,759

(22) Filed: Oct. 11, 2007

(65) Prior Publication Data

US 2009/0100036 A1    Apr. 16, 2009

(51) Int. Cl.
*G06F 17/30* (2006.01)
(52) U.S. Cl. .......... 707/748; 707/731
(58) Field of Classification Search .......... 707/722, 707/731, 748, 999.003
See application file for complete search history.

(56) References Cited

U.S. PATENT DOCUMENTS

| | | | |
|---|---|---|---|
| 7,720,791 B2* | 5/2010 | Hyder et al. .................. 1/1 |
| 7,801,899 B1 | 9/2010 | Spitkovsky | |
| 2003/0220912 A1 | 11/2003 | Fain et al. | |
| 2005/0240580 A1* | 10/2005 | Zamir et al. .............. 707/4 |
| 2006/0036581 A1 | 2/2006 | Chakrabarti et al. | |
| 2006/0149625 A1 | 7/2006 | Koningstein | |
| 2007/0011020 A1 | 1/2007 | Martin | |
| 2008/0133540 A1* | 6/2008 | Hubbard et al. .......... 707/10 |

FOREIGN PATENT DOCUMENTS
KR   10-2001-0104871 A   11/2001

OTHER PUBLICATIONS

Bennett, P., et al., "Probabilistic Combination of Text Classifiers Using Reliability Indicators: Models and Results," *Proceedings of the 25th Annual International ACM SIGIR Conference on Research and Development in Information Retreival*, 2002, pp. 207-214, ACM, New York.
Chekuri, C., et al., "Web Search Using Automatic Classification," *Proceedings of the WWW-96, 6th International Conference on the World Wide Web*, 1996, 11 Pages.
Chen, H., et al., "Bringing Order to the Web: Automatically Categorizing Search Results," *Proceedings of the SIGCHI Conference on Human Factors in Computing Systems*, 2000, pp. 145-152, ACM, New York.
Dumais, S., et al., "Hierarchical Classification of Web Content" *Proceedings of the 23rd Annual International ACM SIGIR Conference on Research and Development in Information Retrieval*, 2000, pp. 256-263, ACM, New York.

\* cited by examiner

*Primary Examiner* — Apu Mofiz
*Assistant Examiner* — Monica Pyo
(74) *Attorney, Agent, or Firm* — Fish & Richardson P.C.

(57) ABSTRACT

This invention relates to determining page elements to display in response to a search. A method embodiment of this invention determines a page element based on a search result. A classification is determined based on a search result. Page elements are generated based on the classification. By using the search result, as opposed to just the query, page elements are generated that corresponds to a predominant interpretation of a user's query within the search results. As result, the page elements may, in most cases, accurately reflect the user's intent.

21 Claims, 23 Drawing Sheets

Example Search Results

Result Set 1302

| Position | Title | Snippet | URL | Label |
|---|---|---|---|---|
| 1 | Burn Recovery and How It Works | The basic first aid treatment for most burns is ... | www.burnrecovery.com | -Treatment<br>-Disease |
| 2 | National Institute of Health | First-degree burns are usually limited to redness ... | www.nih.gov/burn/firstdegree | -Disease<br>-Government |
| 3 | George Burns | Burn's career spanned vaudeville, film, radio, and television ... | www.gburns.com | -Comedy |
| ... | | | | |
| N | | | | .... |

1306   1308   1310   1312   1314

1320, 1330, 1340

Label Histogram

| Label | Frequency |
|---|---|
| Disease | 200 |
| Treatment | 50 |
| Comedy | 45 |
| Government | 20 |
| Carpet | 1 |

Operation of URL Classifier

Determine Classifications and Weights for Full URL and Hostname Only

1504 ⟶ $f(\underline{www.burnrecovery.com}) = \begin{bmatrix} \text{health / health-conditions / burns} & .7 \\ \text{health / treatment} & .3 \end{bmatrix}$ 1502 ⟶ $f(\underline{www.nih.gov/burn/first-degree}) = \begin{bmatrix} \text{health / health-conditions} & .4 \\ \text{health / treatment} & .2 \\ \text{government / agencies} & .4 \end{bmatrix}$ 1506 ⟶ $f(\underline{www.nih.gov}) = \begin{bmatrix} \text{government / agencies} & .7 \\ \text{government / federal} & .3 \end{bmatrix}$ 1508 ⟶ $f(\underline{www.georgeburns.com}) = \begin{bmatrix} \text{comedy / tv} & 1 \end{bmatrix}$

FIG. 15

Calculate Weighted Average of the Full URL and Hostname Only

Suppose $w_{host}$ = weight of hostname only = .3
$w_{full}$ = weight of full URL = .7 health/health-conditions = (.7) (.4) = .28 health/treatment = (.7) (.2) = .14 government/agencies = (.7) (.4) + (.3) (.7) = .28 + .21 = .49    ⌇ 1602 government/federal = (.3) (.3) = .09

FIG. 16

Determine Categories and Weights
For Title and Snippet Classifiers

| | Phrase | Number of Words | Category | Weight |
|---|---|---|---|---|
| 1810 | National | 1 | -government/federal | 1/(1+1+1+2+2+3) = 1/10 = .10 |
| 1812 | Institute | 1 | -government | 1/10 = .10 |
| 1814 | Health | 1 | -health | 1/10 = .10 |
| 1816 | National Institute | 2 | -government/agencies | 2/10 = .20 |
| 1818 | Institute of Health | 2 | -health/treatment | 2/10 = .20 |
| 1820 | National Institute of Health | 3 | -government/agencies | 3/10 = .30 |

FIG. 18

Determine Scores for Label Classifier

1902

| Position | Labels | Category |
|---|---|---|
| 1 | Treatment | health/treatment |
|  |  | heath/health_conditions |
| 2 | Disease | health/health_conditions |
|  | Disease | health/health_conditions |
|  | Government | government/agencies |
| 3 | Comedy | comedy |

1910 — Position 1
1912 — Position 2
1914 — Position 3

1904

| Category | Score |
|---|---|
| health/treatment | 1/5=.20 |
| heath/health_conditions | 3/5=.60 |
| government/agencies | 1/5=.20 |
| comedy | 1/5=.20 |

FIG. 19

Determine Result Scores

| Categories | URL Score | Title Score | Snippit Score | Labels Score | Label Histogram Score |
|---|---|---|---|---|---|
| health/treatment | .40 | .75 | .92 | .20 | .16 |
| health/health_conditions | .20 | .40 | .24 | .60 | .79 |
| health/health_conditions/burns | .70 | .30 | .16 | 0 | 0 |
| government/agencies | .35 | .15 | .10 | .20 | .06 |
| comedy | 0 | 0 | .45 | .20 | .14 |
| comedy/tv | .58 | .15 | .40 | 0 | 0 |
| comedy/radio | 0 | .18 | 0 | 0 | 0 |

2102

2106 — Suppose weight$_{URL}$ = .2; weight$_{title}$ = .1; weight$_{snippet}$ = .2; weight$_{labels}$ = .1; weight$_{Label\ Hist}$ = .4

| Categories | Weighted Average Score |
|---|---|
| health/treatment | (.2)(.40)+(.1)(.75)+ (.2)(.92)+(.1)(.20) +(.4)(.16) = .43 |
| health/health_conditions | (.2)(.20)+(.1)(.24)+ (.2)(.92)+(.1)(.60) +(.4)(.79) = .66 |
| health/health_conditions/burns | (.2)(.70)+(.1)(.30)+ (.2)(.16)+(.1)(0) +(.4)(0) = .20 |
| government/agencies | (.2)(.35)+(.1)(.15)+ (.2)(.10)+(.1)(.20) +(.4)(.06) = .15 |
| comedy | (.2)(0)+(.1)(.10)+ (.2)(.45)+(.1)(.20) +(.4)(.14) = .18 |
| comedy/tv | (.2)(.58)+(.1)(.15)+ (.2)(.40)+(.1)(0) +(.4)(0) = .21 |
| comedy/radio | (.2)(0)+(.1)(.18)+ (.2)(0)+(.1)(0) +(.4)(0) = .02 |

CLASSIFYING SEARCH RESULTS TO DETERMINE PAGE ELEMENTS

BACKGROUND OF THE INVENTION

1. Field of the Invention

This invention relates to determining page elements to display in response to a search.

2. Related Art

A search engine enables a user to search for web pages. A user may submit a query to a search engine. In an example, the user may submit a query using a browser on a client. The browser may send the query as a hypertext transfer protocol (HTTP) request. The HTTP request containing the query may be sent to a server. The server, in turn, sends it onto a search engine. The search engine returns a set of results to the server. The server may generate a page to display the set of results to the user. In an example, the page may be encoded in hypertext markup language (HTML). The server may then send the page to the client as an HTTP response. The browser may then render the page for the user to view.

The server may include a page element on the page, in addition to the set of results. The page element may correspond to a classification. The server may determine a classification, and trigger a page element that corresponds to the classification.

A traditional approach determines a classification based on the query. This approach can problematic, because the query may be an ambiguous indicator of the user's intent. For example, if the query was "burns", a page element related to medical conditions may be generated in the page. However, the page element related to medical conditions may not be relevant to the user, if the user meant "burns" to refer to the comedian, George Burns.

Methods and systems are needed to generate page elements that more accurately correspond to the user's intent.

BRIEF SUMMARY

This invention relates to determining page elements to display in response to a search. A method embodiment of this invention determines a page element based on a set of search results. The method includes: (1) determining a set of result classifications based on the set of search results, and (2) determining the page element based on the set of result classifications. Each result classification includes a result category and a result score.

A system embodiment of this invention generates a page based on a search result. The system includes at least one classifier that determines a set of result classifications based on the search result. Each result classification includes a result category and a result score. A page element trigger manager generates a page based on the set of result classifications. In an embodiment, the at least one classifier can include at least one of a URL classifier, label classifier, label histogram classifier, snippet classifier, and title classifier.

In this way, a classification is determined based on a search result, and a page element is generated based on the classification. By using the search result, as opposed to just the query, page elements are generated that correspond to the predominant interpretation of the user's query within the search results. As result, the page elements may, in most cases, accurately correspond to the user's intent.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements.

Figure 1:
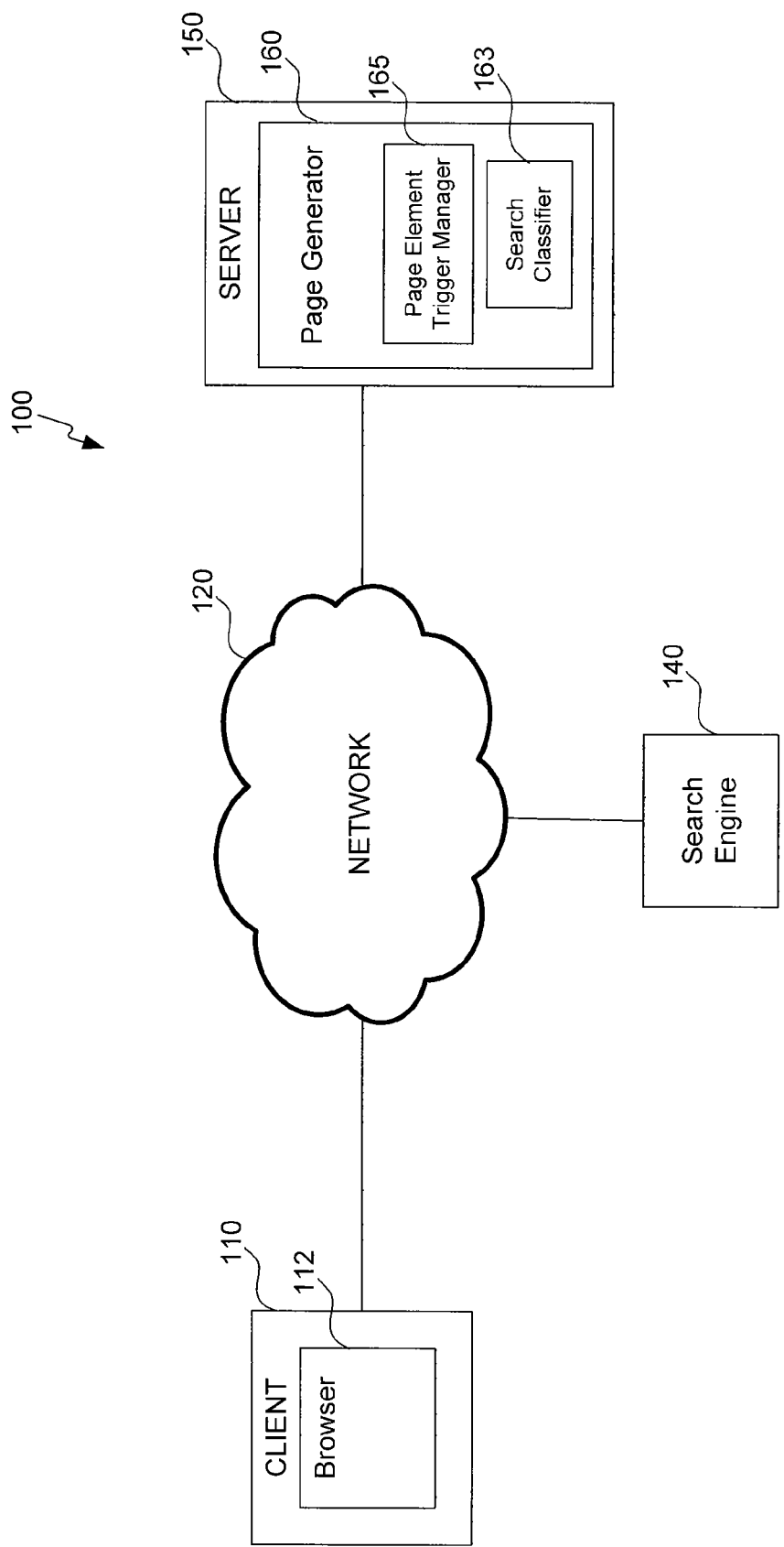
FIG. 1 is an architecture diagram of a system for displaying pages by classifying search results according to an embodiment of this invention.
Figure 5A:
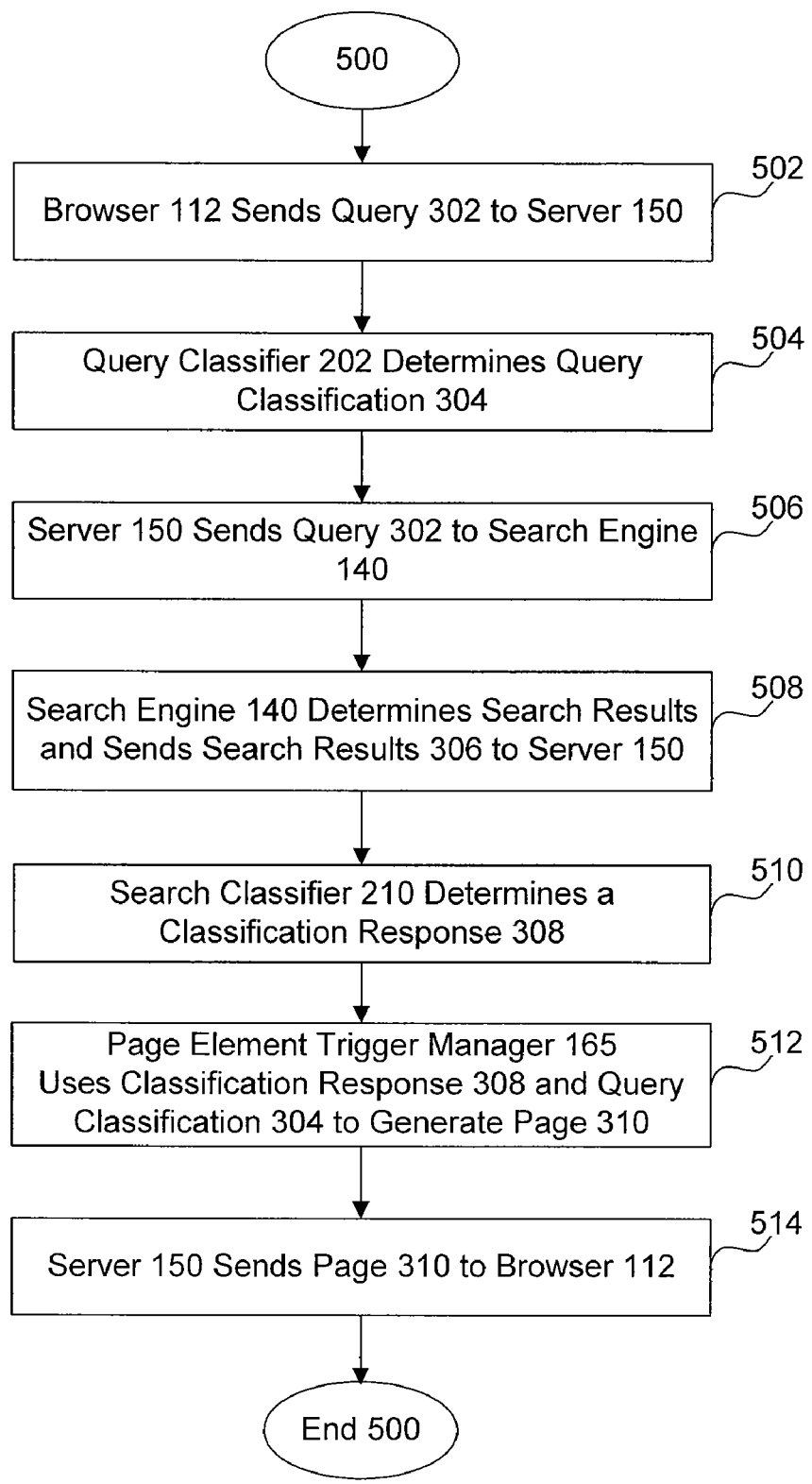

FIG. 5A contains a flowchart showing a method for displaying pages by classifying search results according to an embodiment of this invention, which may be used in operation of the system in FIG. 1.

Figure 5B:
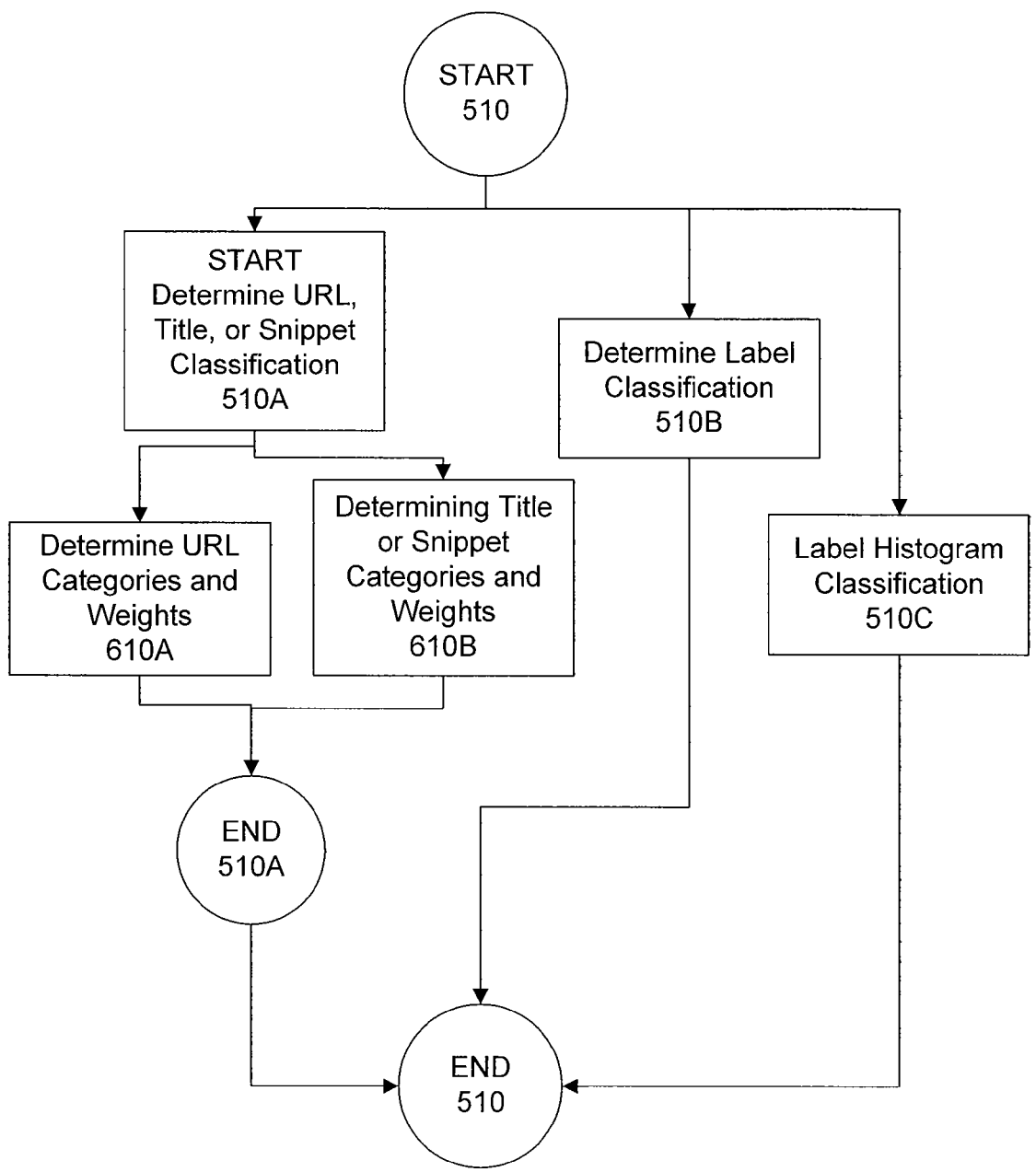

FIG. 5B illustrates various methods to execute a step shown in FIG. 5A for classifying search results.

Figure 5C:
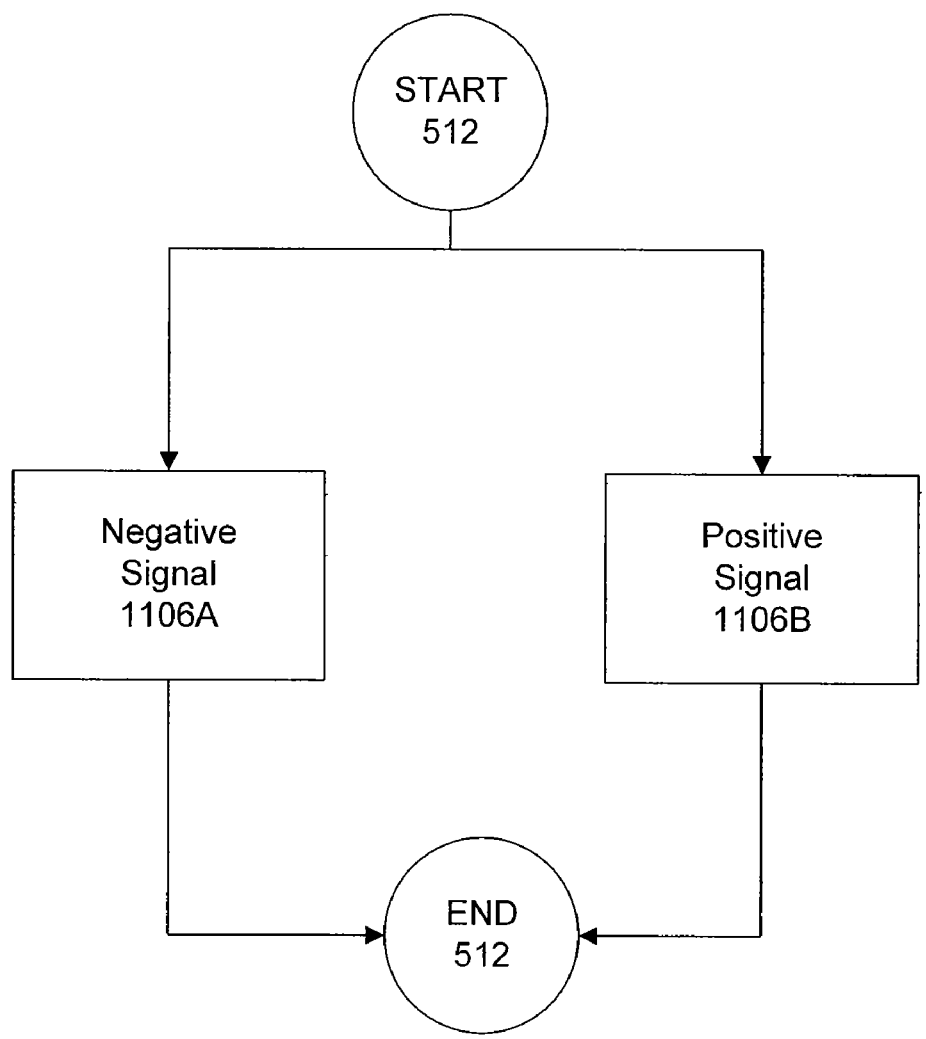

FIG. 5C illustrates various alternative methods to execute a step shown in FIG. 5A for determining page elements.

Figure 6:
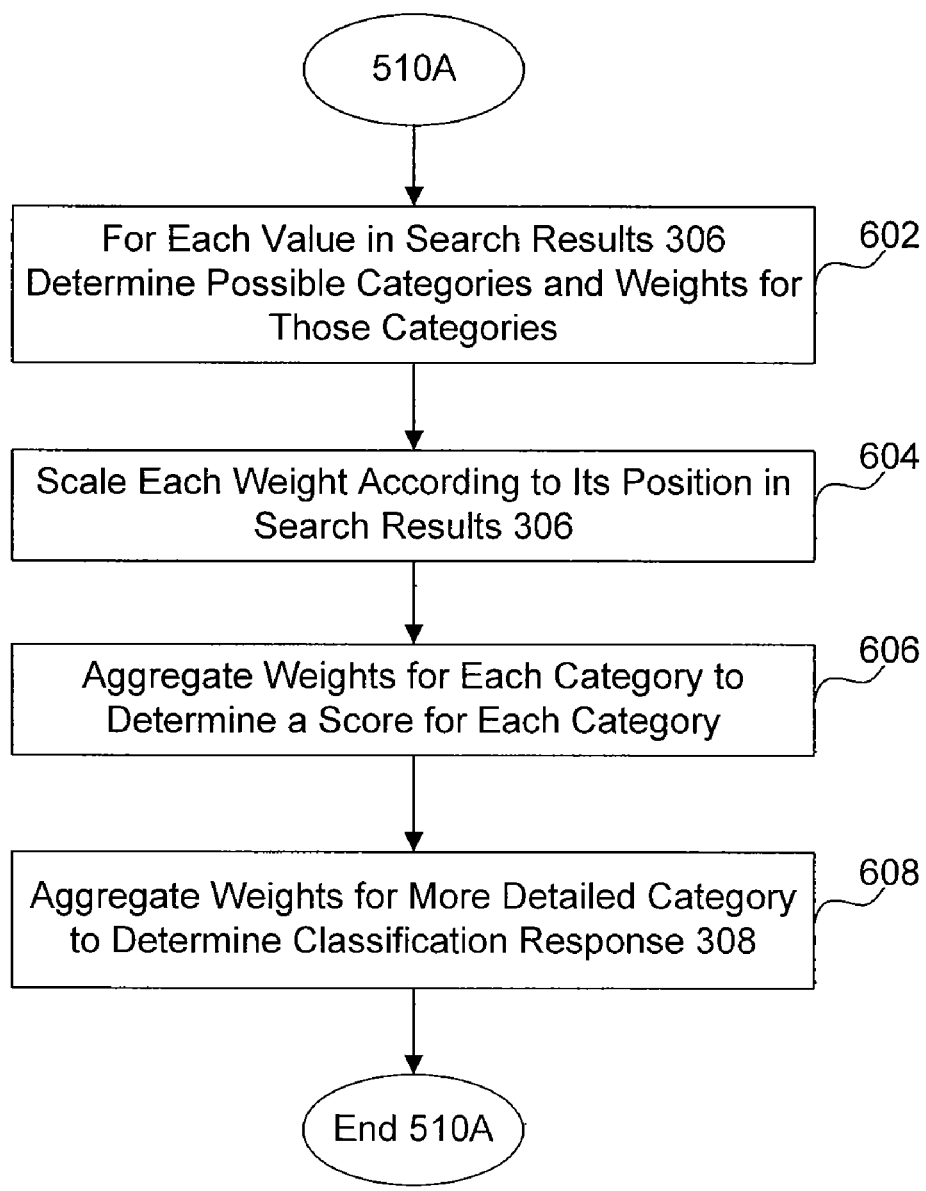

FIG. 6 illustrates a method from FIG. 5B for classifying search results based on a uniform resource locator (URL), title, or snippet from the search results by determining categories and weights.

Figure 7:
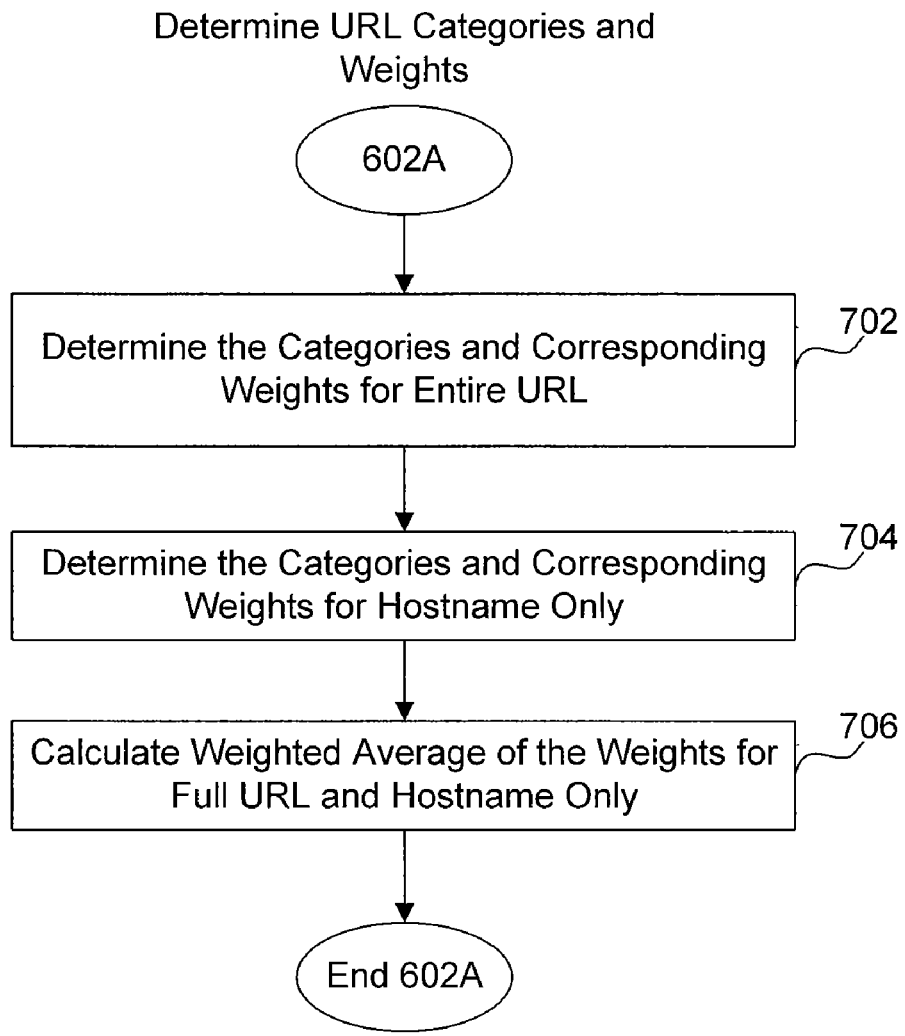

FIG. 7 illustrates a method to determine categories and weights used by the method in FIG. 6 when classifying the search result based on the URL.

Figure 8:
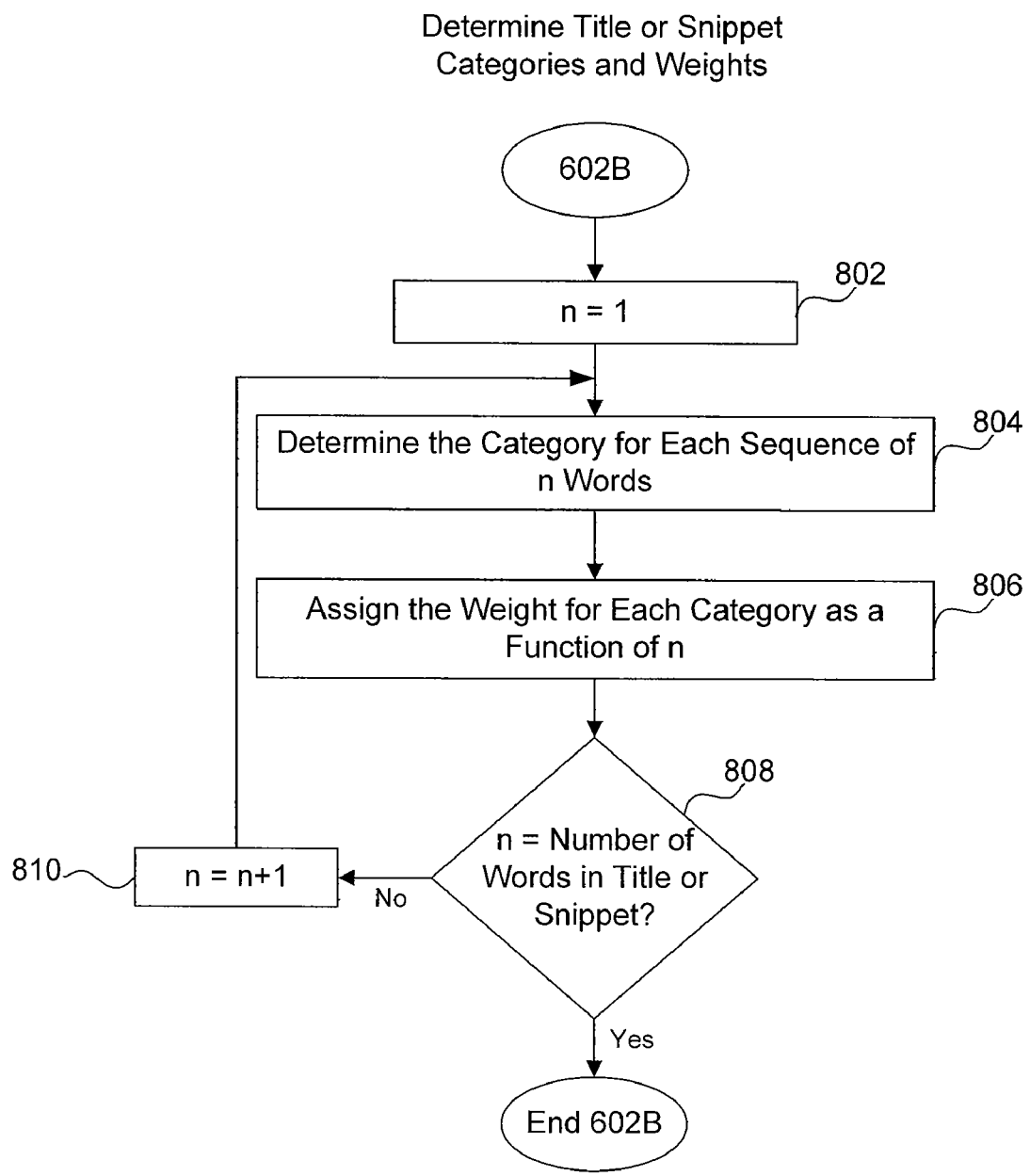

FIG. 8 illustrates a method to determine categories and weights used by the method in FIG. 6 when classifying the search result based on the title or snippet.

Figure 9:
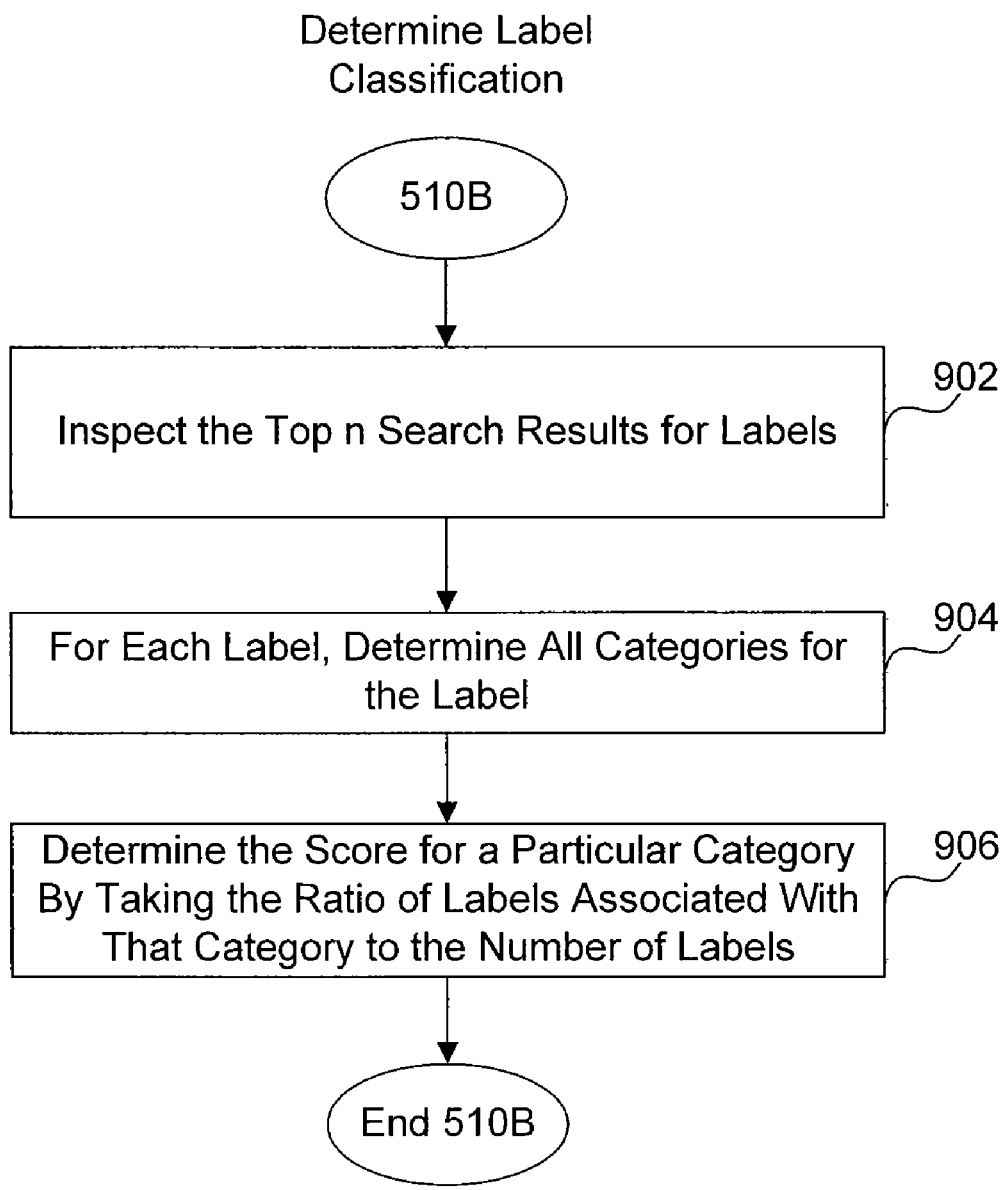

FIG. 9 illustrates a step from the method in FIG. 5B for classifying search results based on a label from the search results.

Figure 10:
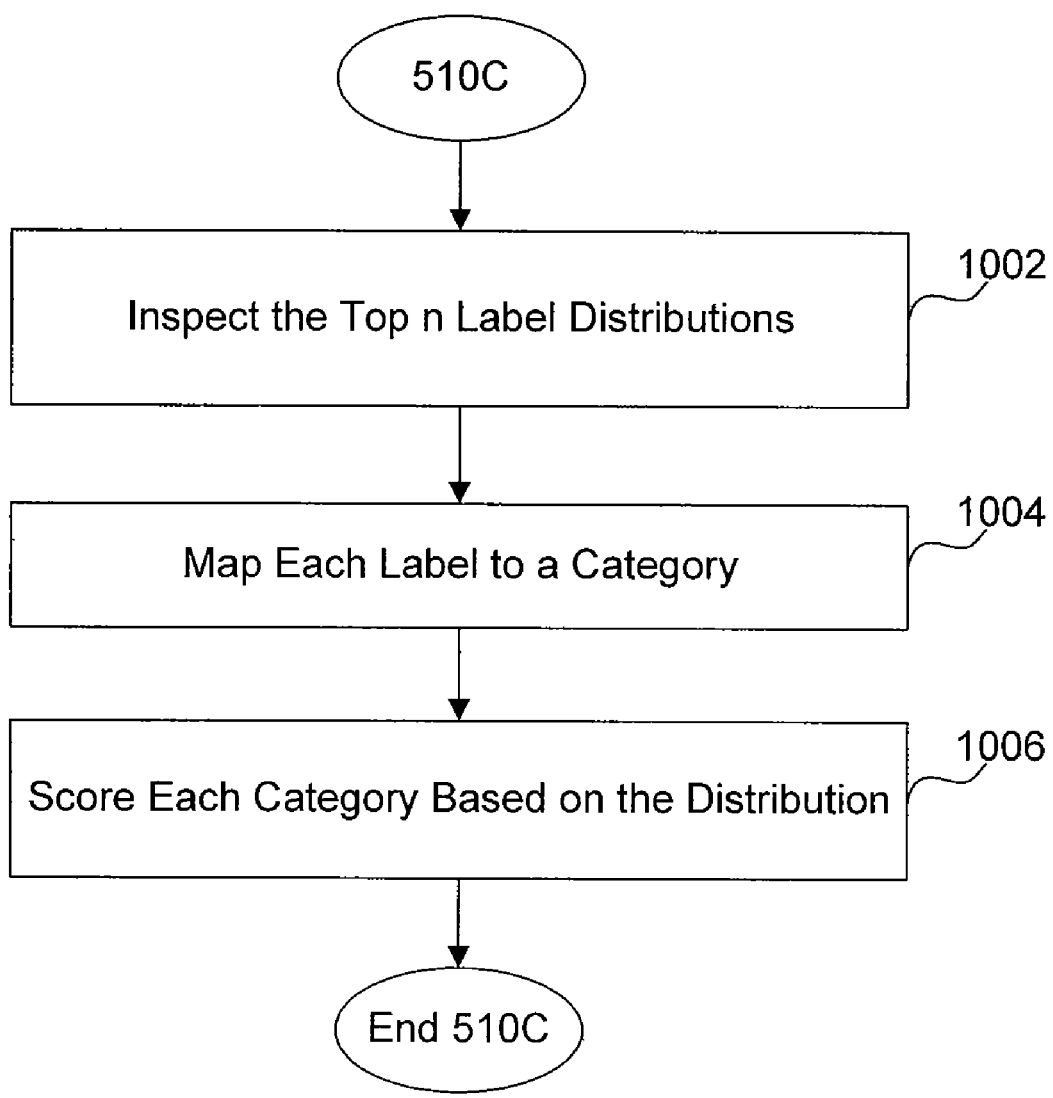

FIG. 10 illustrates a step from the method in FIG. 5B for classifying search results based on a label histogram in greater detail.

Figure 11:
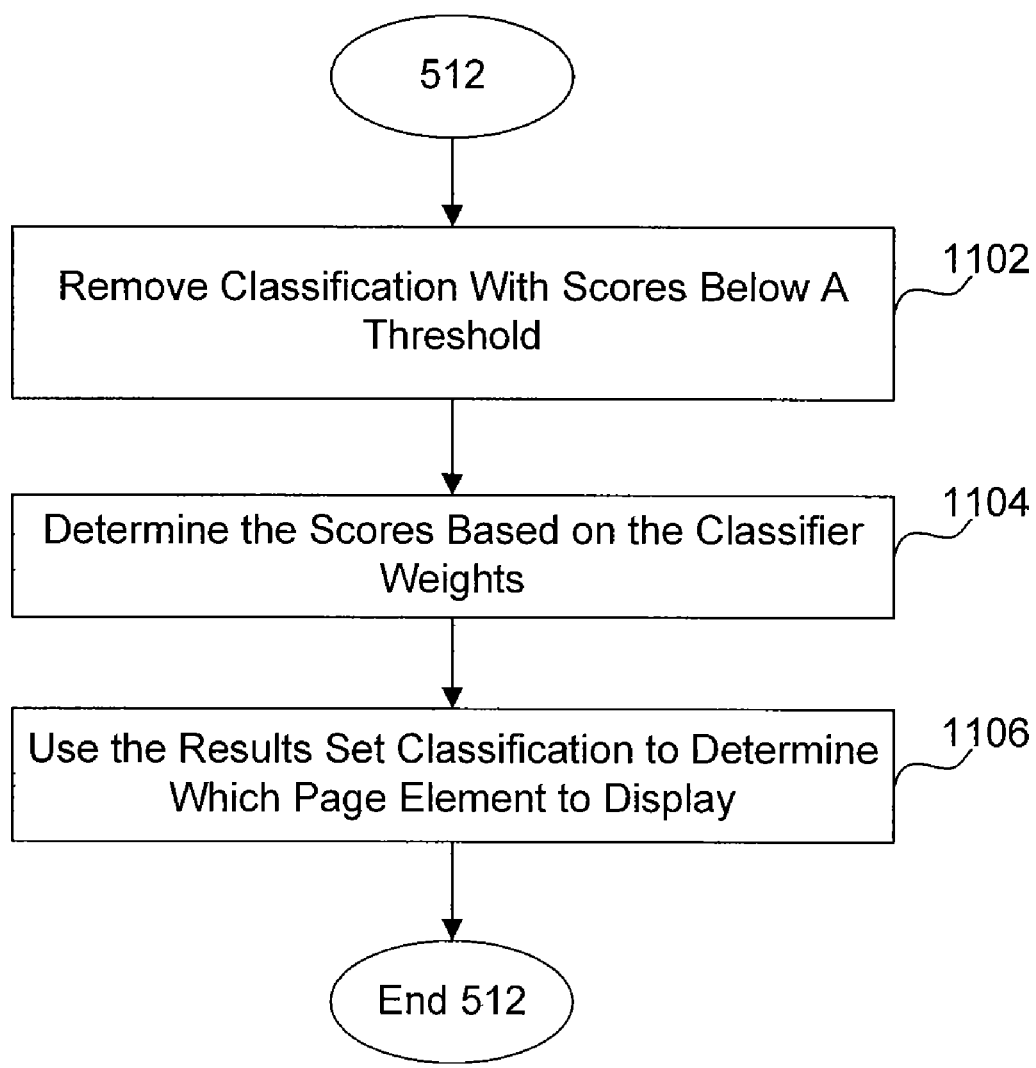

FIG. 11 illustrates a step from the method in FIG. 5A for determining which page elements to display in greater detail.

Figure 12A:
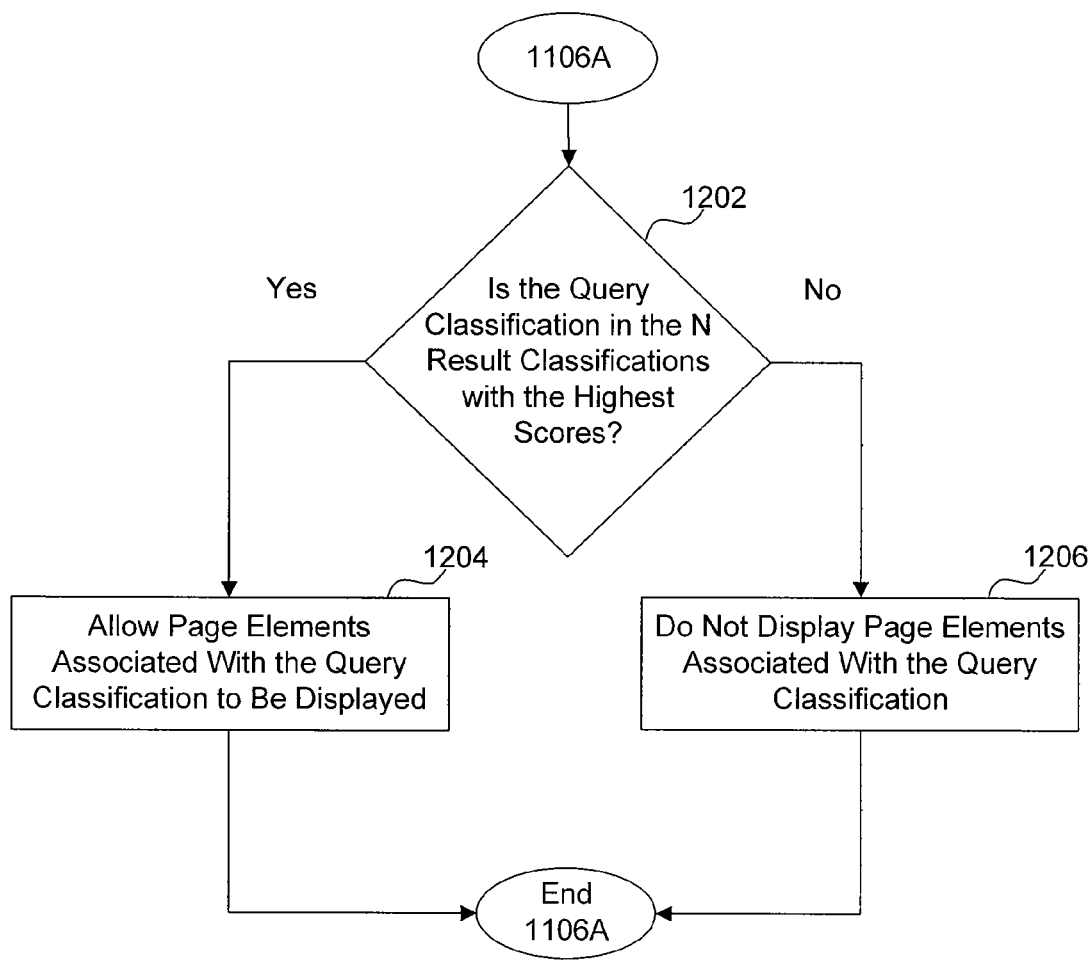
Figure 12B:
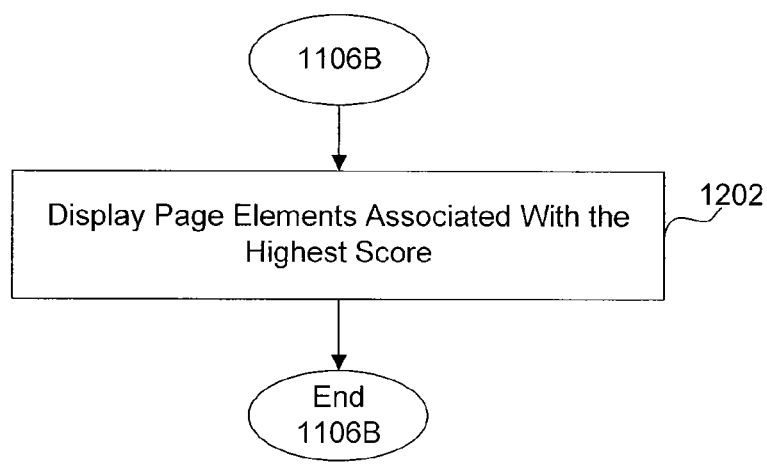

FIGS. 12A and 12B illustrate alternative methods for a step from the method in FIG. 11 for determining which page elements to display based on a classification of the search results.

FIG. 13 illustrates an example set of search results.

Figure 14A:
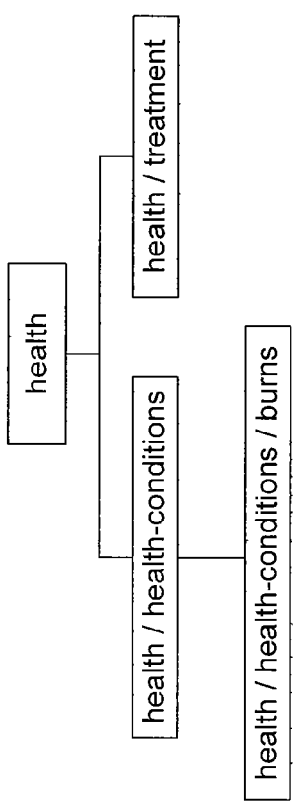
Figure 14B:
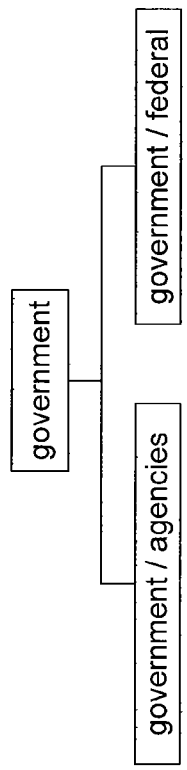
Figure 14C:
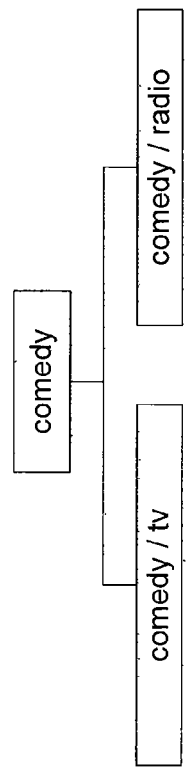

FIGS. 14A-C illustrates an example hierarchy of categories.

Figure 17:
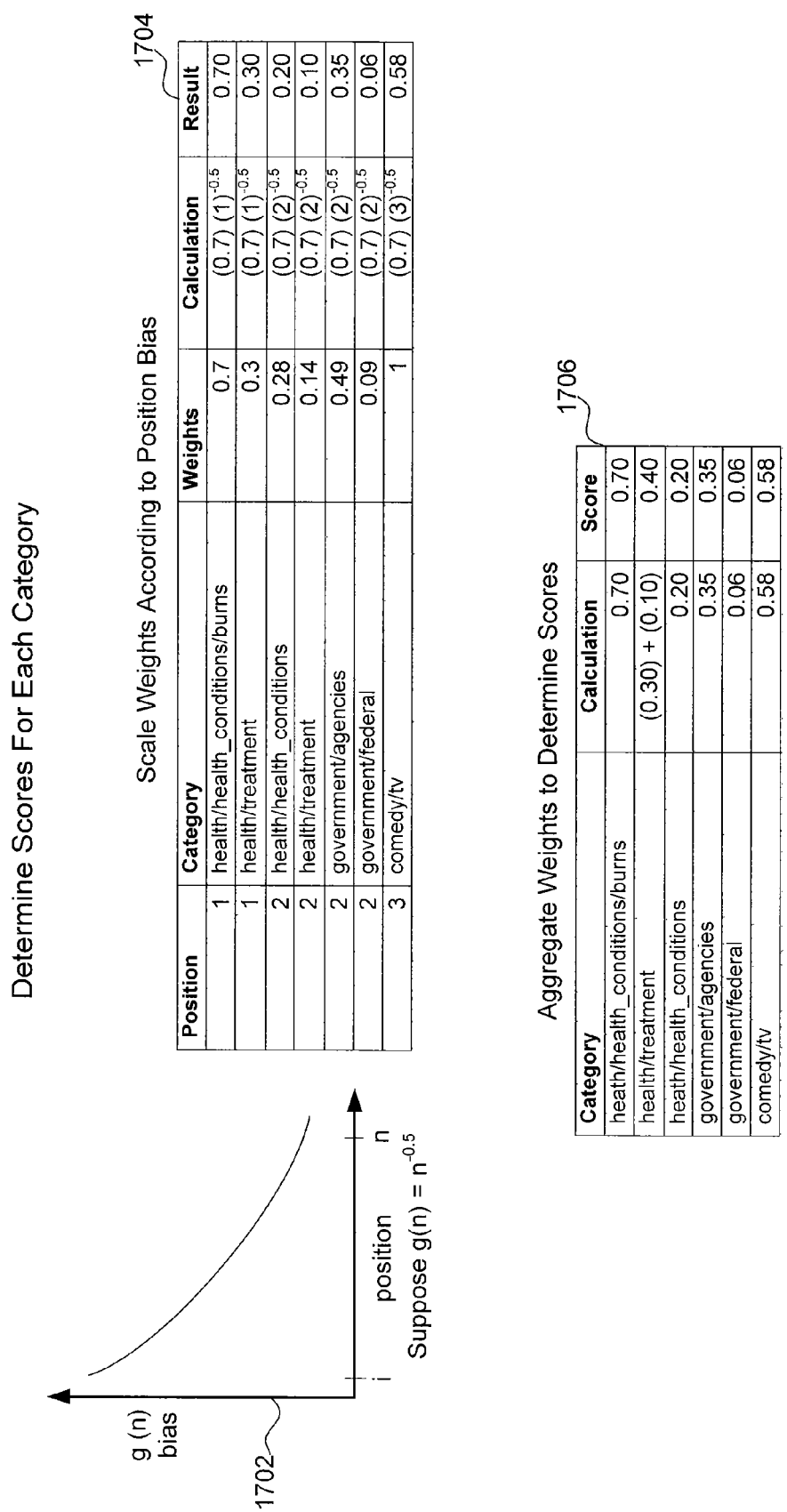

FIG. 15-17 illustrate an example operation to determine a URL classification according to the methods in FIG. 6 and FIG. 7.

FIG. 18 illustrates an example operation to determines categories and weights for titles or snippets according to the methods in FIG. 8.

FIG. 19 illustrates an example of determining a label classification according to the methods in FIG. 9.

Figure 20:
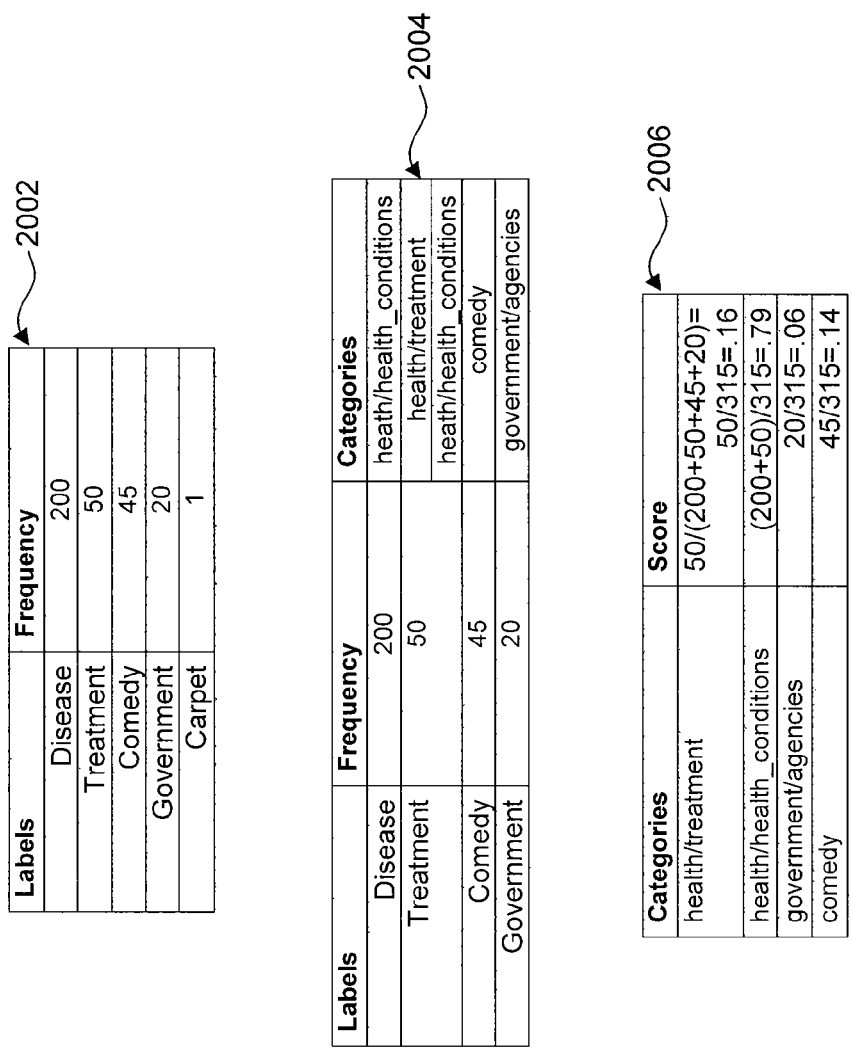

FIG. 20 illustrates an example of determining a label histogram classification according to the methods in FIG. 10.

FIG. 21 illustrates an example of determining scores based on classifier weights.

DETAILED DESCRIPTION OF EMBODIMENTS

This invention relates to systems and methods for classifying search results to determine page elements to display.

Embodiments of this invention classify search results and use the classification to determine which page elements to use in generating a page for display. By classifying the search result, as opposed to just the query, embodiments of this invention generate page elements that correspond to the predominant interpretation of the user's query within the search results. As result, the page elements may, in most cases, accurately correspond to the user's intent.

In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

This detailed description of embodiments is divided into several sections. The first section describes a system according to an embodiment of this invention with respect to FIGS. 1-4B. The second section describes a method according to an embodiment of this invention with respect to FIGS. 5A-12B, which may be used in operation of the system. The third section illustrates an example of the method with respect to FIG. 13-21.

System

This section describes a system according to an embodiment of this invention with respect to FIGS. 1-4B.

FIG. 1 is an architecture diagram of a system for displaying pages by classifying search results according to an embodiment of this invention. FIG. 1 shows system 100. System 100 includes a client 110, a search engine 140, and a server 150, connected by one or more networks 120.

Each of client 110, search engine 140, and server 150 may be implemented on a computing device. Such a computing device can include, but is not limited to, a personal computer, mobile device such as a mobile phone, workstation, embedded system, game console, television, or set-top box. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display.

Client 110, search engine 140, and server 150 may be implemented on one or more computing devices at the same or at different locations. For instance, client 110, search engine 140, and server 150 may be remote from one another on different computing devices coupled to a network, such as network 120. In still another example, server 150 and search engine 140 may be implemented on one or computing devices at a common location and coupled to a remote client 110 over network 120. Other combinations and configuration for arranging client 110, server 150, and search engine 140 may be used as would be apparent to a person skilled in the art given this description.

Network 120 may be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Client 110 includes a browser 112. For example, browser 112 may be a web browser or other type of browser for browsing content. Browser 112 can send a request over network 120 to server 150 and receive a response from server 150. As an example, not to limit the present invention, the request may be an HTTP request. The HTTP request may contain parameters entered by a user using a user interface. The response may be an HTTP response. An HTTP response may contain web content, such as a hypertext markup language (HTML), images, video, or multimedia content.

Server 150 may include a web server or may be coupled to communicate with a web server at the same of a different location. A web server is a software component that responds to a hypertext transfer protocol (HTTP) request with an HTTP response. As illustrative examples, the web server may be, without limitation, Apache HTTP Server, Apache Tomcat, Microsoft Internet Information Server, JBoss Application Server, WebLogic Application Server, or Sun Java System Web Server. The web server may contain web applications which generate content in response to an HTTP request. The web server may package the generated content and serve the content to a client in the form of an HTTP response. Such content may include hypertext markup language (HTML), extendable markup language (XML), documents, videos, images, multimedia features, or any combination thereof. This example is strictly illustrative and does not limit the present invention.

According to an embodiment, server 150 includes a page generator 160. Page generator 160 determines which page elements to display and generates a page containing those page elements. In an illustrative example, the page may include search results and other page elements determined to be included in the page according to an embodiment of the present invention. In an example, a page may be encoded in HTML and a page element may be a portion of HTML containing some text. This example is illustrative and is not meant to limit the present invention.

In an embodiment, page generator 160 includes a page element triggering manager 165 and a search classifier 163. Page element triggering manager 165 triggers page elements. Page elements are portions of a page including some content. Search classifier 163 determines at least one classification based on a search result. Each classification may include a category and score. Page element triggering manager 165 uses the classification to determine which page elements to use in generating the page. This will be described in more detail below. By using search results to determine which page elements to display, page generator 160 generates a page that corresponds to search engine 140's predominant interpretation of the user's query as represented by the search results. As result, the page elements may, in most cases, accurately correspond to the user's intent.

Each of browser 112, page generator 160, search classifier 163, page element triggering manager 165, and search classifier 163 may be implemented as software, hardware, firmware, or any combination thereof.

Figure 2:
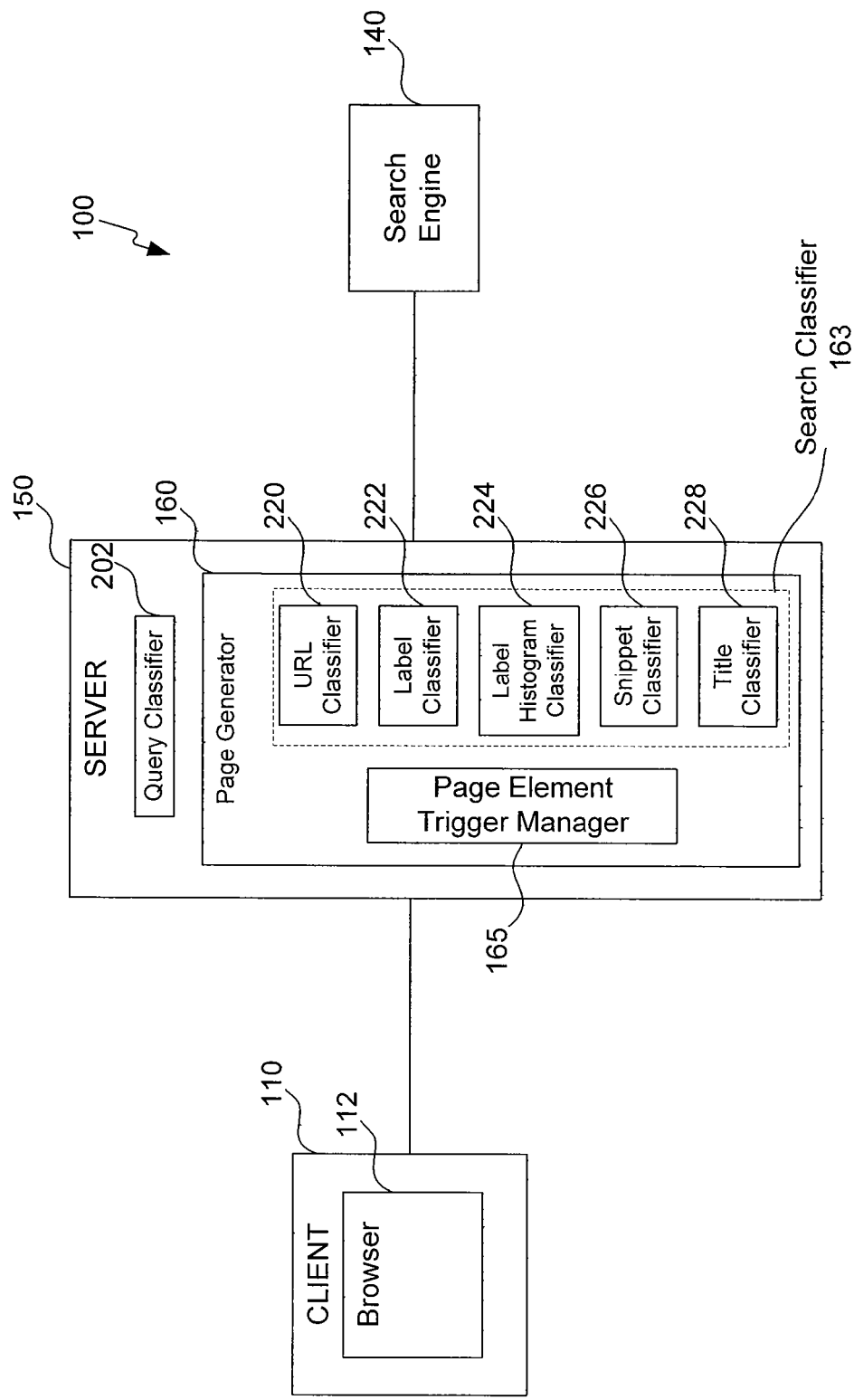
FIG. 2 shows the components of the system in FIG. 1 in more detail.

FIG. 2 shows the components of system 100. As shown in FIG. 2, client 110 may communicate with server 150, and server 150 may communicate with search engine 140. As discussed previously, this communication may take place over one or more networks 120, such as the Internet.

Server 150 contains a query classifier 202. Query classifier 202 determines a query classification based on the query. A query classification may include a category and score. In an embodiment, page element triggering manager 165 may use the query classification in conjunction with the classification from search classifier 163 to determine which the page elements to use in generating the page. By using search results to determine which page elements to display, server 150 generates a page that corresponds to search engine 140's predominant interpretation of the user's query. As result, the page elements may, in most cases, accurately correspond to the user's intent.

Page generator 160 includes page element triggering manager 165 and search classifier 163. Search classifier 163 may include a URL (uniform resource locator) classifier 220, a label classifier 222, a label histogram classifier 224, a snippet classifier 226, and/or a title classifier 228. Each of those components may generate a classification based on a portion of the search results generated by search engine 140. URL classifier 220 determines a classification based on a URL; label classifier 222 determines a classification based on a label; label histogram classifier 224 determines a classification based on a label; snippet classifier 226 determines a classification based on a snippet; and title classifier 228 determines a classification based on a title. The classifications are then used by page element triggering manager 165 to select page elements. How each classification is generated and how the page elements are selected based on those classifications is described in more detail below. By using search results to determine which page elements to display, page generator 160 generates a page that corresponds to search engine 140's predominant interpretation of the user's query. As result, the page elements may, in most cases, accurately correspond to the user's intent.

Each of query classifier 202, URL classifier 220, label classifier 222, label histogram classifier 224, snippet classifier 226, and title classifier 228 may be implemented as hardware, software, firmware, or any combination thereof.

Figure 3:
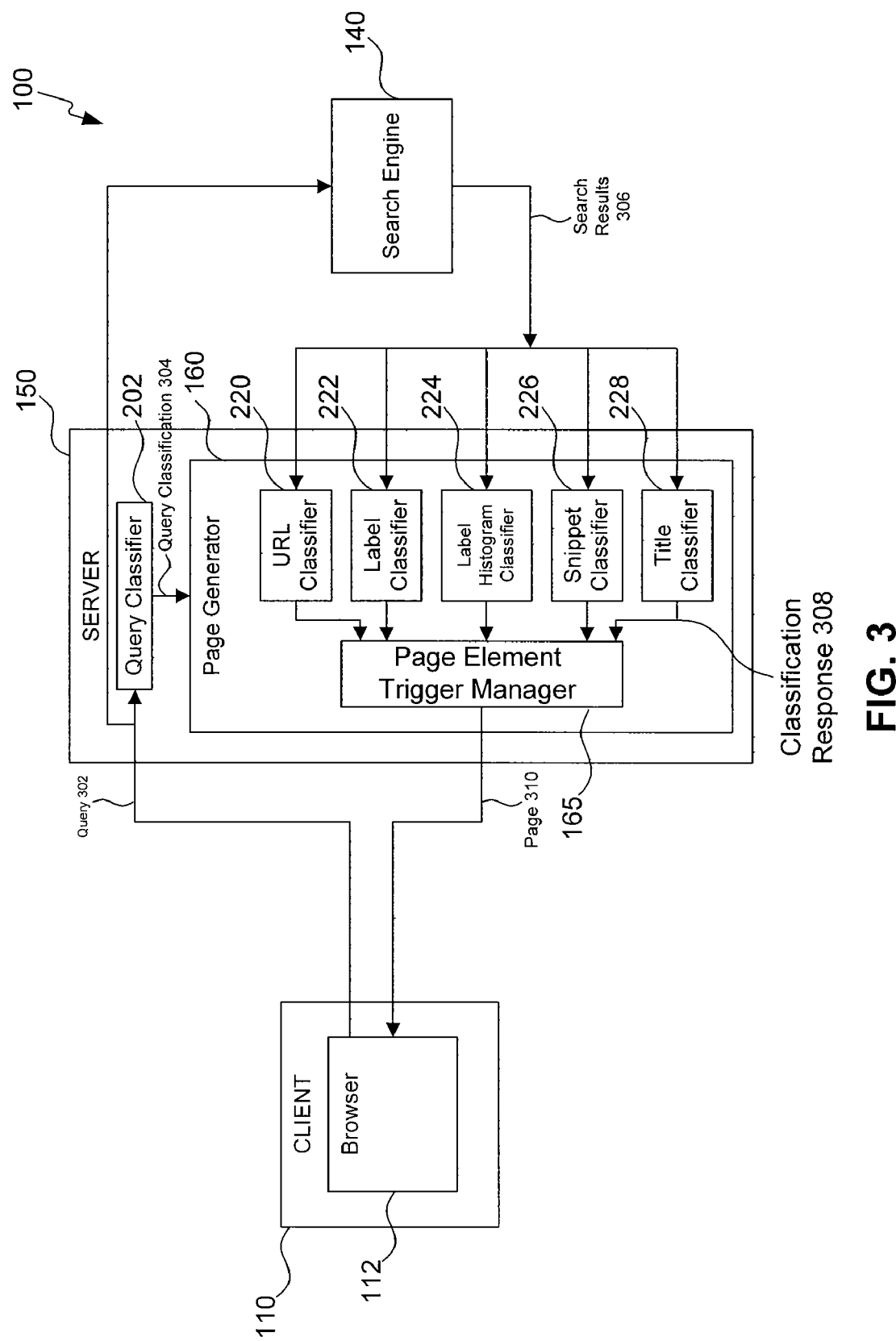
FIG. 3 shows how the components of FIG. 2 may interoperate, including data the components may send to each other.

FIG. 3 shows how the components of system 100 may interoperate, including data the components may send to each other.

Browser 112 may send a query 302 to server 150. An example, query 302 may be HTTP parameters generated by the browser using an HTML form. In an example, an HTML form may be displayed by an user interface to a user. The user enters data representing query into an HTML form using a user interface. The user then presses a submit button on the HTML form. This triggers the browser to generate an HTTP request that includes query 302 as HTTP parameters. This example is merely illustrative and is not intended to limit the present invention.

Once server 150 receives the query 302, query classifier 202 may use query 302 to generate a query classification 304. In an example, query classification 304 may include a category and a score. Query classification 304 may be used by page element triggering manager 165 in conjunction with the classifications from the search classifier 163 to determine which page elements to display.

Server 150 also sends query 302 onto search engine 140. In response to query 302, search engine 140 generates search results 306. Search engine 140 may use any known search technique to generate search results 306. Search results 306 includes hits from the search and information about the hits. Search results 306 is described in more detail below with respect to FIG. 4A. Not all hits found for a query are necessarily present in the result set.

Search results 306 are received by server 150 and each classifier 220 through 228. Each classifier 220 through 228 analyzes a different portion of the search results and returns a classification response 308. Each classification response 308 includes a classification. More detail about classification response 308 is provided below with respect to FIG. 4B.

Page element triggering manager 165 uses classification response 308 to generate a page 310. Page 310 includes page elements determined based on classification response 308. Once page 310 is generated, server 150 sends page 310 onto client 110 to be displayed by browser 112.

Figure 4A:
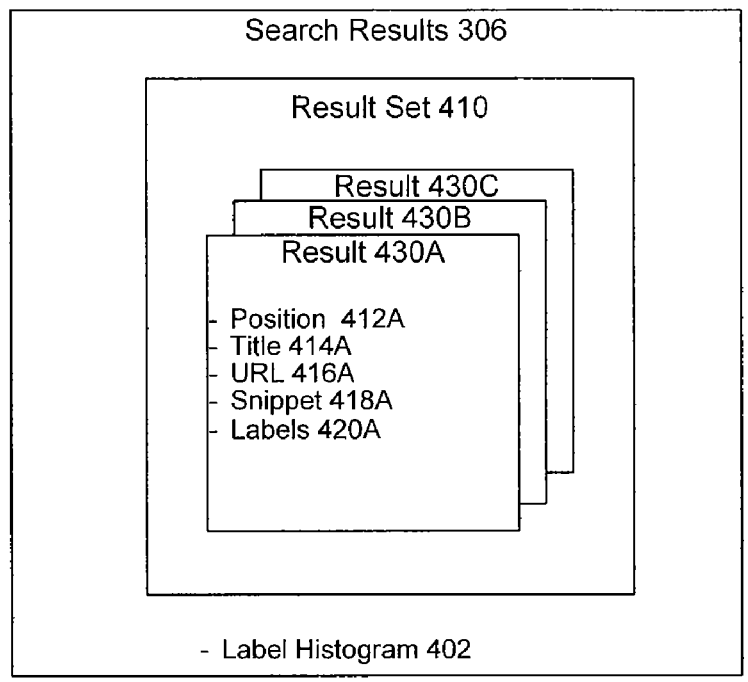
FIGS. 4A and 4B show data structures of FIG. 3 in more detail.
Figure 4B:
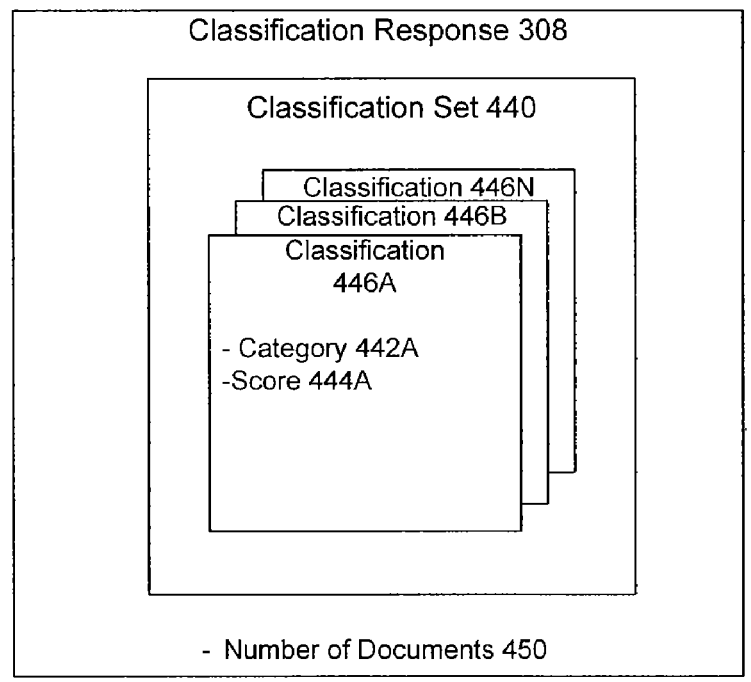

FIGS. 4A and 4B show data structures of FIG. 3 in more detail.

FIG. 4A shows the structure of search results 306. Search results 306 includes a result set 410 and a label histogram 430. Result set 410 includes results 430A-N. A plurality of results are shown, but in practice one or more may be used. Each result 430A-N represents a hit in the search. In the example of a web search, the hit represents a web site found that is related to query 302.

Each result 430A through N contains a position 412, a URL 416, a title 414, a snippet 418, and a label 420. Position 412 is the position in the result set. Generally, position 412 is related to relevance. For example, more relevant results are earlier in the result set and therefore have a lower position 412. URL 416 is the uniform resource locator of the web site found. Title 414 may be the title of the web site found. Snippet 418 is an excerpt from the web site found. Label 420 is a label describing the web site content. The result may have zero or more labels 420.

Search results 306 also contains a label histogram 402. Label histogram 402 includes a list of labels and corresponding frequencies. The frequency may indicate the number of instances of that label in the set of search results.

FIG. 4B shows a classification response 308. Classification response 308 includes a classification set 440. Classification set 440 includes classification 446A-N. For clarity multiple classifications 446A-N are shown, but, in practice, one or more may be used. Each element of classification set 440 also contains a category 442 and a score 444. For clarity, a classification from URL classifier 220 may be referred to as a URL classification; a classification from label classifier 222 may be referred to as a label classification; a classification from label histogram classifier 224 may be referred to as a label histogram classification; a classification from snippet classifier 226 may be referred to as a snippet classification; and a classification from title classifier 228 may be referred to as a title classification.

Classification response 308 also includes a number of documents 450. Number of documents 450 may indicate the number of results used by the classifier to generate the classification.

Operation

This section describes a method according to an embodiment of this invention with respect to FIGS. 5A-12B, which may be used in operation of the system.

FIG. 5A contains a flowchart showing a method for displaying pages by classifying search results according to an embodiment of this invention, which may be used in operation of system 100.

FIG. 5A contains method 500. For clarity, method 500 is described with respect to system 100, it is not meant to be limited thereto.

Method 500 is a high-level overview of the method used to generate a page. Method 500 begins by receiving a query (step 502). The query, for example, may be query 302 sent from browser 112 to server 150. Then, a query classification is determined based on the query. Query classifier 202 may determine the query classification. The query is received by a search engine, such as search engine 140 (step 506). Search results generated by the search engine are received, for example, by server 150 (step 504). A classification response is determined based on the search results (step 510). Step 510 is described in further detail below. A page is generated based on the classification response and/or the query classification (step 512). This step is described in further detail below. Finally, the page is outputted (step 514). For example, the page may be outputted from server 150 to browser 112 at step 514, and browser 112 displays page 310 at step 516.

By using search results to determine which page elements to display, method 500 generates a page that corresponds to a predominant interpretation of the user's query within the search results. As result, the page elements may, in most cases, accurately correspond to the user's intent.

Step 510 can vary depending on the classifier used. FIG. 5B shows how the method can vary between the various classifiers. FIG. 5B shows that the URL determining the title or snippet classification process uses method 510A. Method 510A depends on whether the URL is being classified or the title or snippet is being classified. If the URL is being classified, URL weights and categories are determined at 610A. If title or snippet categories are being determined, method 510A uses method 610B to determine title or snippet categories and weights. Label classifier 222 uses method 510B. Label histogram classification uses method 510C. The methods are described in more detail below.

Step 512 can also vary. Two alternatives for step 512 are shown in FIG. 5C. As alternatives, step 512 can employ a negative symbol or a positive symbol. The negative signal is demonstrated in method 1106A, whereas the positive signal is demonstrated in 1106B. The methods are described in more detail below.

FIG. 6 shows a method 510A for determining the URL, title, or snippet classification. Method 510A may, for example, be used by URL classifier 220, snippet classifier 226, or title classifier 228. Method 510A begins by determining the categories and corresponding weights for each result in search results 306 (step 602). Step 602 is described in more detail below. Then, each weight is scaled according to its position in search results 306 (step 604). The weights for each category are aggregated to determine the score for that category (step 606). Then, an optional step aggregates weights based on sub-category to determine classification response 308 (step 608). This method, for example, may be executed by URL classifier 220, snippet classifier 226, and title classifier 228.

FIG. 7 illustrates a method to determine categories and weights used by method 510A at step 602 when classifying the search result based on the URL. FIG. 7 shows method 602A. Method 602A begins by determining the categories and corresponding weights for the entire URL (step 702). Then, method 602A determines the categories and corresponding weights for a hostname of the URL only (step 704). In both cases, the categories and weights may be determined, for example, using a simple look-up table. Then, a weighted average may be determined for the weights for the full URL and hostname only (step 706). This method, for example, may be executed by URL classifier 220.

FIG. 8 illustrates a method to determine categories and weights used by method 510A at step 602 when classifying the search result based on the title or snippet. Method 602B shows an example of step 602 for the title or snippet. A loop variant n is equal to 1 (step 802). Method 602B determines the category for each sequence of words with a length n (step 804). This may be determined, for example, using a simple look-up table. The weight for each category is determined as a function of n (step 806). For example, a sequence of one word would yield a lower weight than a sequence of five words. Control changes depending on whether the number of words in the title or snippet is equal to n (decision block 808). If the number of words in the title or snippet is equal to n, n increments (step 810), otherwise method 602B ends. This method, for example, may be executed by snippet classifier 226 and title classifier 228.

FIG. 9 illustrates a method for classifying search results based on a label from the search results used by method 500.

FIG. 9 illustrates a method 510B for determining a label classification. As an example, the label classification may be determined by label classifier 222. Method 510B begins by inspecting the top n search results for labels (step 902). Then, for each label, method 510B determines all the label categories for the label (step 904). This may be determined, for example, using a simple look-up table. Method 510B determines the weight for particular category by taking the ratio for all the labels according to that category to the number of labels (step 906).

FIG. 10 illustrates a method for classifying search results based on a label histogram used by method 500.

FIG. 10 illustrates a method 510C for determining a label histogram classification. As an example, the label histogram classification may be determined by label histogram classifier 224. Method 510C begins by inspecting the top n label distributions (step 1002). Then, each label is mapped to a category (step 1004). The category may be determined, for example, using a simple look-up table. Finally, a score is determined for each category based on distribution (step 1006).

FIG. 11 illustrates a method for generating a page used by method 500. FIG. 11 contains a method 512, which illustrates step 512 in method 500 in more detail. In an example, method 512 may be executed by page element triggering manager 165.

Method 512 begins by removing classifications with scores below a certain threshold (step 1102). Next, method 512 determines a result classification set. The result classification set is a set of result classifications. Each result classification contains a category and a score. Method 512 may determine the result scores based on the classifier weights (step 1104). As an example, the result scores may be determined using a weighted average. The weights may be optimized using an adaptive optimization algorithm. Examples of an adaptive optimization algorithm include, but are not limited to, a hill-climbing, stochastic hill-climbing, A-star, or genetic algorithm. The number of documents 450 may be used to optimize the weights.

In a step not shown the result classification set may be packaged with the number of results used. Together, this forms a classification response.

Method 512 uses the result classifications to determine which page elements to display (step 1106). Several variations of step 1106 are discussed in more detail below. After step 1106, method 512 ends.

FIGS. 12A and 12B illustrate alternative methods for step 1106 from method 512 for determining which page elements to display based on a classification of the search results.

FIG. 12A shows a method 1106A. Method 1106A uses a query classification in conjunction with a result classification. Method 1106A begins by evaluating whether the query classification is in the top N result classifications (decision block 1202). If the query classification is the top N result classifications, method 1106A allows a page element associated with the query classification to be displayed (step 1204). Otherwise, method 1106A does not allow the page element associated with the query classification to be displayed (step 1206).

FIG. 12B shows a method 1106B. Method 1106B displays a page element associated with the result classification with the highest score (step 1202).

By using search results to determine which page elements to display, page generator 160 generates a page that corresponds to a predominant interpretation of the user's query within the search results. As result, the page elements may, in most cases, accurately reflect the user's intent.

Example Operation

This section describes an example of method 500 in an embodiment of this invention. Also, this example illustrates the operation of system 100 in an embodiment of this invention. This example is illustrative and is not intended to limit the present invention.

Example Search Results

FIG. 13 illustrates an example search results 1300. Search results 1300 may be generated by a search engine, such as search engine 140, in response to a query, such as query 302.

FIG. 13 shows an example result set 1302 and an example label histogram 1304. Example result set 1302 contains N results. Of the N results, a result 1320 is shown at position 1, a result 1330 is shown at position 2, and a result 1340 is shown at position 3. Result set 1302 is shown as a table where each row shows a result and each column shows an element of the result. Column 1306 shows a position. Column 1308 shows a title. Column 1310 shows a snippet. Column 1312 shows a URL. Column 1314 shows one or more labels.

In the example provided, result 1320 and result 1330 relate to the medical condition burns, while result 1340 relates to George Burns the comedian. For brevity, many of the later examples use only these results, however, any number of results might be used.

Label histogram 1304 shows various labels in the search results, along with the corresponding frequencies.

Once example search results 1306 is received by each classifier, each classifier determines a classification response, such as classification response 308.

Determining an Example Classification Response

Once example search results 1306 is received by each classifier, each classifier determines a classification response. As described with respect to FIG. 4B, each classification response contains one or more classifications. Each classification includes a category and a score. First, this section describes example categories with respect to FIGS. 14A-C. Second, this section describes how each classifier determines the classification response is discussed with respect to FIGS. 15-19.

FIGS. 14A-C show a hierarchy of categories used in this example. Categories may be structured as a tree. The tree contains a root category. The root category may have child categories. The child categories may be parents of further child categories.

FIG. 14A shows a category tree relating to health. The root of the tree is a root category "heath". That root category has children "health/conditions" and "health/treatment". The category "health/health-conditions" has a further child "health/health-conditions/burns".

FIG. 14B shows a category tree related to government. At the root of the tree is a root category "government". The root category has children "government/government agencies" and "government/federal".

FIG. 14C shows a category tree related to comedy. The root of the tree is a category "comedy". The root category has children "comedy/TV" and "comedy/radio".

Determining an Example URL Classification Response

FIGS. 15-17 illustrate an example operation to determine a URL classification, according to method 510A and method 602B.

FIG. 15 shows an example operation of a URL classifier. To determine the URL classifications, the URL classifier must classify URL categories and weights. This is done, for example, as shown in method 602A.

Method 602A begins by determining the categories and corresponding weights for the entire URL at step 702. This is shown at 1502 in FIG. 15 where the entire URL for search result 1330 is mapped to a set of categories and corresponding weights. Notice this set of categories comes from the tree shown in FIGS. 14A-C. Search results 1320 and 1340 the entire URL is a hostname so the categories and weights for the entire URL are determined at 1504 and 1508 for result 1320 and 1340 respectively. The categories and weights may be determined, for example, using a simple lookup table.

At step 704, the categories and weights are determined for the hostname portion of the URL only. At 1506, the categories and weights for the hostname version of the URL are determined for search result 1330. At 1504 and 1508 the categories and weights are determined for search result 1320 and 1340 respectively. The categories and weights may be determined, for example, using a simple lookup table.

After the full URL and hostname only categories and weights have been calculated, categories and weights for the URL must be determined. This may be done by taking the weighted average as at step 706. An example is shown at FIG. 16. If the weighted average is being used, weights for the corresponding hostname only and full URL must be determined. In the example shown the weights for the hosting only is 0.3 and the weight for the full URL is 0.7. The two weights must add up to 1. The weights may be determined, for example using an adaptive optimization algorithm. Because result 1320 and 1340 have the same weights for full URL and hostname only, taking the weighted average has no effect. However, search result 1330 has different full URL and hostname so those two values must be aggregated as shown at 1602. FIG. 16 aggregates the various categories and shows the new weights as shown.

Once the categories and weights for each search result are determined, a score must be evaluated for each category. This is shown in FIG. 17. To calculate a score, a position bias must be applied, as at step 604. The position bias adjusts the weights so that weights from a result lower with a lower position counts more than a result with a higher position. This makes the score more accurate, because, generally a result with a lower position is more relevant than a result with a higher position. In the example shown in FIG. 17, the position bias is the function $g(n)=n^{-0.5}$. This function is shown at 1702. This example is merely illustrative; any decreasing function may be used. At table 1704, the weights are scaled according to the position bias. In other words, a position bias is evaluated for each category of each result, and the weight is scaled according to the calculation of the position bias. The scaled weight is in the result column. Finally, the weights need to be aggregated across all the results to determine the scores for each category. This is shown at 1706.

Once the score for each category is calculated, each category and corresponding score may be packaged into a URL classification. All the URL classifications together form a URL classification set. The URL classification set may be packaged with the number of results used to generate the classification set to form a URL classification response.

Determining an Example Title or Snippet Classification Response

FIG. 18 demonstrates the example operation of snippet classifier 226 and title classifier 228 to determine a label or snippet classification, which is demonstrated in method 510A. To determine the label or snippet classification, categories and weights for the category and snippet must be determined. This is done, for example, according to method 602B.

For brevity, FIG. 18 demonstrates an example of method 602B for only one title—the title of result 1330. However, the same process is used for each title and snippet for each result. Table 1802 shows the example of method 602B. The title of result 1330 is "National Institute of Health".

At step 802, a loop variant n is set to one. At step 804, the categories determined for each sequence of one word. Row 1810, 1812, and 1814 each contain a sequence of one word. Each word maps to at least one category. This may be done, for example, using a simple lookup table. Next at step 806, a weight is assigned as a function of the loop variant, n. In the examples shown, the function is the ratio of the number of words in that particular phrase to the number of the sum of all the number of words in all the phrases evaluated. This example is merely illustrative and does not limit the invention. The sum of all the words across all the number of the phrases to be evaluated here is ten. For the sequences at row 1810, 1812, and 1814, the number of words is one, therefore the weight is one divided by ten or 0.1.

At decision block 808, control changes depending on whether n is equal to the number of words in the title or snippet. Here, the number of words in the title is equal to 3, and n is equal to 1. Therefore, control passed to step 810

At step 810, the loop variant n is incremented to two. Row 1818 and 1816 show the sequences of two words determined at step 804. The sequence at row 1818 is "Institute of Health". In an example embodiment, this may count as only two words, since "of" is a short preposition. At each row 1818 and 1816 a category is determined. The weights for row 1818 and 1816 are determined.

The loop variant n is incremented a final time to make it equal to three. Row 1820 shows the sequence of three words. A category is determined. Finally, the weight is calculated for the category.

Once the categories and weights are determined for all the titles and snippets, a score must be determined for each category. This may be done by applying a position bias to each and aggregating the biased weights for each category, as shown in FIG. 17.

Once the score for each category is calculated, each category and corresponding score may be packaged into a title or snippet classification. All the title or snippet classifications together form a title or snippet classification set. The title or snippet classification set may be packaged with the number of results used to generate the classification set to form a title or snippet classification response.

Determining an Example Label Classification Response

FIG. 19 illustrates an example of determining the label classification according to the method 510B.

Step 902 inspects the top n search results. In the example, the top n search results are result 1320, 1330, and 1340. At step 904, for each label, one or more categories are determined for the label. This may be done with, for example, a simple lookup table. Table 1902 shows categories for each result. Rows 1910, 1912, and 1914 map labels to categories for result 1320, 1330, and 1340 respectively.

Step 906 determines the score for each particular category by taking the ratio for labels associated with that category to the number of labels. This is shown in table 1904.

Once the score for each category is calculated, each category and corresponding score may be packaged into a label classification. All the label classifications together form a label classification set. The label classification set may be packaged with the number of results used to generate the classification set to form a label classification response.

Determining an Example Label Histogram Classification Response

FIG. 20 illustrates an example operation to determine a label histogram classification according to the method 510C. This method may be used in operation of the label histogram classifier 224.

Table 2002 represents the label histogram from the search results. Table 2002 contains a list of labels. Each label maps to a frequency.

Step 1002 inspects the top n label distributions. Here, n is equal to four, so the top four label distributions are used to determine the label histogram classification. The four label distributions are at table 2004. Step 1004 maps each label to at least one category. Table 2004 shows how the labels map to various categories.

The next step 1006 determines the score for each category. An example of step 1006 is seen with table 2006. In this example, the score is determined by taking the ratio of the frequency of that category to the sum of all the frequencies. In this case, the sum of all the frequencies is 200 plus 50 plus 45 plus 20 is equal to 315. For the category "health/treatment," the only occurrence is at row 2014 with frequency of 50. So, the score is 50 divided by 315, which is equal to 0.16. The category "health/health conditions" occurs at row 2012 with the frequency 200 for the label disease and the row 2014 with frequency 50 for the label treatment. The sum of 200 plus 50 is equal to 250. Two hundred fifty divided by 315 is equal to 0.79. Category "government/agencies" occurs at row 2018 the label government with frequency 20. Twenty divided by 315 is equal to 0.06. Comedy occurs with frequency 45 at label comedy at row 2016. Forty-five divided by 315 is equal to 0.14.

Once the score for each category is calculated, each category and corresponding score may be packaged into a label histogram classification. All the label histogram classifications together form a label histogram classification set. The label histogram classification set may be packaged with the number of results used to generate the classification set to form a histogram classification response.

Determining an Example Page Element to Display

FIG. 21 illustrates an example of determining result classification scores based on classifier weights. FIG. 21 shows step 1104 to determine the result classification scores. Table 2002 shows the categories and the scores from each of the classification steps. Step 1508 determines results scores based on the scores from the classifications from each of the classifiers. In the examples shown, a weighted average is used to determine the result scores. The weighted average uses weights as shown at 2106. The weights may be adjusted using an adaptive optimization algorithm that optimizes the use of the various classifiers. As an example, the number of results in each classification response may also be used to determine the weights.

Table 2104 shows the weighted average calculation for each of the categories. The result of this calculation is the result score. The combination of the category and the result score is the result classification. All the result classifications together form a result classification set.

In an optional step (not shown) the result scores may be aggregated based on sub-categories. For example, the result score for the category "health/health-conditions" is an aggregation of the score for category "health/health-conditions" and sub-category "health/health-conditions/burns. Further, the result score for category "health" is an aggregation of the score for category "health" and sub-categories "health/health-conditions" and "health/health-treatment".

The result classification set may be used by the page element triggering manager 165 to determine the page 310. Page element triggering manager 1605 may use either a negative signal or a positive signal, as described above. The negative signal is shown at step 1106A in FIG. 12A. The positive signal is shown at method 1106B at FIG. 12B.

By using search results to determine which page elements to display, this example generates a page that corresponds to a predominant interpretation of the user's query within the search results. As result, the page elements may, in most cases, accurately reflect the user's intent.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   receiving a result set, the result set including a plurality of individual search results of a query, each of the individual search results including a first search result part and a second search result part that is different from the first search result part, wherein:
      the first search result part is exactly one of a uniform resource locator (URL), a hostname from the URL, a title, a snippet, a label, or a label histogram, and
      the second search result part is exactly one of a URL, a hostname from the URL, a title, a snippet, a label, or a label histogram;
   determining, by operation of one or more computing devices, an interpretation of the query from the individual search results, the interpretation being represented as a result classification of the result set as a whole, the result classification including a result category and a result score for the result set, wherein determining the result classification comprises:
   for each of the plurality of individual search results:
      determining, based on the first search result part:
         a first search result part category for determining the interpretation of the query; and
         a corresponding first search result part score;
      determining, based on the second search result part:
         a second search result part category for determining the interpretation of the query; and
         a corresponding second search result part score; and
      determining an individual result category and a corresponding individual result score based on the first search result part category, the second search result part category, and a weighted combination of the first search result part score and second search result part score; and
   determining the result category and the result score for the result set based on the individual result categories and corresponding individual result scores;
   identifying, by operation of one or more computing devices, a page element that corresponds to the interpretation of the query, based on the interpretation of the query as represented by the result classification; and
   providing for display a page that includes the page element in addition to at least a portion of the result set.

2. The method of claim 1, wherein the result set is ordered, the method further comprising:
   determining the weighted combination using one or more specified weights,
   the specified weights being adjusted based on a position of each individual search result in reference to other individual search results in the results set.

3. The method of claim 1, wherein:
   the first search result part is a URL;
   the second search result part is a hostname from the URL;
   determining the first search result part category and the corresponding first search result part score includes determining a full URL category and a corresponding full URL weight based on the URL;
   determining the second search result part category and the corresponding second search result part score includes determining a hostname category and a corresponding hostname weight based on the hostname from the URL; and
   determining the individual result category and the corresponding individual result score includes determining the individual result category and the corresponding individual result score based on the URL categories of the individual search results, the hostname categories of the individual search results, and a combination of the corresponding URL weights and the corresponding hostname weights.

4. The method of claim 3, wherein determining the individual result category and the corresponding individual result score comprises:
   adjusting each URL category and corresponding URL weight according to a position of the URL in the result set; and determining the individual result category and the corresponding individual result score based on the adjusted URL categories and corresponding URL weights.

5. The method of claim 1, further comprising:
determining a query classification based on the query, wherein the query classification includes a query category.

6. The method of claim 5, wherein determining the result classification comprises:
selecting the result classification from among a set of result classifications when the result category of the result classification corresponds to the query category.

7. The method of claim 1, wherein determining the result classification comprises:
selecting the result classification from among a set of result classifications, wherein the result score of the result classification is a highest result score among result scores of result classifications in the set.

8. The method of claim 1, wherein:
the label histogram includes a set of labels, each label of the set of the labels corresponding to a frequency, the frequency indicating a number of instances of the label in the result set.

9. The method of claim 1, wherein:
each of the individual search results include a third search result part that is different from the first search result part and from the second search result part, wherein the third search result part is one of a uniform resource locator (URL), a hostname from the URL, a title, a snippet, a label, or a label histogram; and
the method further comprises:
determining, by operation of one or more computing devices, an interpretation of the query from the individual search results, the interpretation being represented as a result classification of the result set as a whole, the result classification including a result category and a result score for the result set, wherein determining the result classification further comprises:
for each for each of the plurality of individual search results:
determining, based on the third search result part:
a third search result part category for determining the interpretation of the query; and
a corresponding third search result part score; and
determining an individual result category and a corresponding individual result score based on the first search result part category, the second search result part category, and the third search result part category, and a weighted combination of the first search result part score, the second search result part score, and the third search result part score; and
determining the result category and the result score for the result set based on the individual result categories and corresponding individual result scores.

10. A system, comprising:
one or more computing devices configured to perform operations comprising:
receiving a result set, the result set including a plurality of individual search results of a query, each of the individual search results including a first search result part and a second search result part that is different from the first search result part, wherein:
the first search result part is exactly one of a uniform resource locator (URL), a hostname from the URL, a title, a snippet, a label, or a label histogram, and
the second search result part is exactly one of a URL, a hostname from the URL, a title, a snippet, a label, or a label histogram;
determining an interpretation of the query s from the individual search results, the interpretation being represented as a result classification of the result set as a whole, the result classification including a result category and a result score for the result set, wherein determining the result classification comprises:
for each of the plurality of individual search results:
determining, based on the first search result part:
a first search result part category for determining the interpretation of the query; and
a corresponding first search result part score; determining, based on the second search result part:
a second search result part category for determining the interpretation of the query; and
a corresponding second search result part score; and
determining an individual result category and a corresponding individual result score based on the first search result part category, the second search result part category, and a weighted combination of the first search result part score and second search result part score; and
determining the result category and the result score for the result set based on the individual result categories and corresponding individual result scores;
identifying, based on interpretation of the query as represented by the result classification, a page element that corresponds to the interpretation of the query; and
providing for display a page that includes the page element in addition to at least a portion of the result set.

11. The system of claim 10, further comprising:
determining the specified weights being adjusted based on a position of each individual search result in reference to other individual search results in the results set.

12. The system of claim 10, wherein:
the first search result part is a URL;
the second search result part is a hostname from the URL;
determining the first search result part category and the corresponding first search result part score includes determining a full URL category and a corresponding full URL weight based on the URL;
determining the second search result part category and the corresponding second search result part score includes determining a hostname category and a corresponding hostname weight based on the hostname from the URL; and
determining the individual result category and the corresponding individual result score includes determining the individual result category and the corresponding individual result score based on the URL categories of the individual search results, the hostname categories of the individual search results, and a combination of the corresponding URL weights and the corresponding hostname weights.

13. The system of claim 12, wherein determining the individual result category and the corresponding individual result score comprises:
adjusting each URL category and corresponding URL weight according to a position of the URL in the result set; and
determining the individual result category and the corresponding individual result score based on the adjusted URL categories and corresponding URL weights.

14. The system of claim 13, further comprising a query classifier that determines a query classification based on the query, wherein the query classification includes a query category.

15. The system of claim 14, wherein a page element trigger manager selects the page element corresponding to the query category when the query category corresponds to the result category of the result classification of the result set.

16. The system of claim 10, wherein identifying the page element comprising identifying a page element corresponding to a result category having a highest result score.

17. The system of claim 10, wherein determining the result classification comprises:
   determining a set of title classifications based on a title from the result set; and
   determining the result classifications based on the set of title classifications.

18. The system of claim 10, wherein
   the label histogram includes a set of labels, each label of the set of labels corresponding to a frequency, the frequency indicating a number of instances of the label in the result set.

19. A computer program product tangibly stored on a storage device, the product operable to cause a computing device to perform operations comprising:
   receiving a result set, the result set including a plurality of individual search results of a query, each of the individual search results including a first search result part and a second search result part that is different from the first search result part, wherein:
      the first search result part is exactly one of a uniform resource locator (URL), a hostname from the URL, a title, a snippet, a label, or a label histogram, and
      the second search result part is exactly one of a URL, a hostname from the URL, a title, a snippet, a label, or a label histogram;
   determining an interpretation of the query from the individual search results, the interpretation being represented as a result classification of the result set as a whole, the result classification including a result category and a result score for the result set, wherein determining the result classification comprises:
   for each of the plurality of individual search results:
      determining, based on the first search result part:
         a first search result part category for determining the interpretation of the query; and
         a corresponding first search result part score;
      determining, based on the second search result part:
         a second search result part category for determining the interpretation of the query; and
         a corresponding second search result part score; and
      determining an individual result category and a corresponding individual result score based on the first search result part category, the second search result part category, and a weighted combination of the first search result part score and second search result part score; and
   determining the result category and the result score for the result set based on the individual result categories and corresponding individual result scores;
   identifying, based on the interpretation of the query as represented by the result classification, a page element that corresponds to the interpretation of the query; and
   providing for display a page that includes the page element in addition to at least a portion of the result set.

20. The product of claim 19, wherein determining the individual result category and the corresponding individual result score comprises:
   determining scores on a position of the search result in reference to other individual search results in the results set, each score being associated with a result part category; and
   determining the individual result category and the corresponding individual result score based on the first search result part category, the second search result part category, and a combination of the first search result part score, and the second search result part score.

21. The product of claim 19, wherein:
   the first search result part is a URL;
   the second search result part is a hostname from the URL;
   determining the first search result part category and the corresponding first search result part score includes determining a full URL category and a corresponding full URL weight based on the URL;
   determining the second search result part category and the corresponding second search result part score includes determining a hostname category and a corresponding hostname weight based on the hostname from the URL; and
   determining the individual result category and the corresponding individual result score includes determining the individual result category and the corresponding individual result score based on the full URL category, the hostname category, and a combination of the corresponding URL weight and the corresponding hostname weight.

* * * * *

UNITED STATES PATENT AND TRADEMARK OFFICE
CERTIFICATE OF CORRECTION

PATENT NO.         : 8,103,676 B2
APPLICATION NO.    : 11/870759
DATED              : January 24, 2012
INVENTOR(S)        : Tania Bedrax-Weiss et al.

It is certified that error appears in the above-identified patent and that said Letters Patent is hereby corrected as shown below:

Cover page, item (75), Line 2, delete "Ramanthan Guha" and insert -- Ramanathan Guha --

Cover page, item (56), under Other Publications, Column 2, Line 4, delete "Retreival," and insert -- Retrieval, --

In Column 14, Line 30, in Claim 1, delete "clement" and insert -- element --

In Column 15, Line 41, in Claim 9, delete "for each for each" and insert -- for each --

In Column 15, Line 66, in Claim 10, delete "hostnamc" and insert -- hostname --

In Column 16, Line 4, in Claim 10, after "query" delete "s"

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,103,676 B2
APPLICATION NO. : 11/870759
DATED : January 24, 2012
INVENTOR(S) : Bedrax-Weiss et al.

Page 1 of 6

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 774 days.

In Claim 1, column 13, line 61 - column 14, line 34, delete

"1. A method comprising:
 receiving a result set, the result set including a plurality of individual search results of a query, each of the individual search results including a first search result part and a second search result part that is different from the first search result part, wherein:
  the first search result part is exactly one of a uniform resource locator (URL), a hostname from the URL, a title, a snippet, a label, or a label histogram, and
  the second search result part is exactly one of a URL, a hostname from the URL, a title, a snippet, a label, or a label histogram;
 determining, by operation of one or more computing devices, an interpretation of the query from the individual search results, the interpretation being represented as a result classification of the result set as a whole, the result classification including a result category and a result score for the result set, wherein determining the result classification comprises:
  for each of the plurality of individual search results:
   determining, based on the first search result part:
    a first search result part category for determining the interpretation of the query; and
    a corresponding first search result part score;
   determining, based on the second search result part:

Signed and Sealed this
Eighth Day of January, 2013

David J. Kappos
*Director of the United States Patent and Trademark Office* a second search result part category for determining the interpretation of the query; and a corresponding second search result part score; and determining an individual result category and a corresponding individual result score based on the first search result part category, the second search result part category, and a weighted combination of the first search result part score and second search result part score; and determining the result category and the result score for the result set based on the individual result categories and corresponding individual result scores;

identifying, by operation of one or more computing devices, a page element that corresponds to the interpretation of the query, based on the interpretation of the query as represented by the result classification; and providing for display a page that includes the page element in addition to at least a portion of the result set"

and insert

-- 1. A method comprising:

receiving a result set, the result set including a plurality of individual search results of a query, each of the individual search results including a first search result part and a second search result part that is different from the first search result part, wherein:

the first search result part is exactly one of a uniform resource locator (URL), a hostname from the URL, a title, a snippet, a label, or a label histogram, and the second search result part is exactly one of a URL, a hostname from the URL, a title, a snippet, a label, or a label histogram;

determining, by operation of one or more computing devices, an interpretation of the query from the individual search results, the interpretation being represented as a result classification of the result set as a whole, the result classification including a result category and a result score for the result set, wherein determining the result classification comprises:

for each of the plurality of individual search results:

determining, based on the first search result part:

a first search result part category for determining the interpretation of the query; and a corresponding first search result part score;

determining, based on the second search result part:

a second search result part category for determining the interpretation of the query; and a corresponding second search result part score; and determining an individual result category and a corresponding individual result score based on the first search result part category, the second search result part category, and a weighted combination of the first search result part score and second search result part score; and determining the result category and the result score for the result set based on the individual result categories and corresponding individual result scores;

identifying, by operation of one or more computing devices, a page element that corresponds to the interpretation of the query, based on the interpretation of the query as represented by the result classification; and providing for display a page that includes the page element in addition to at least a portion of the result set --.

In Claim 10, column 16, line 26-28, delete

"10. A system, comprising:
one or more computing devices configured to perform operations comprising:
receiving a result set, the result set including a plurality of individual search results of a query, each of the individual search results including a first search result part and a second search result part that is different from the first search result part, wherein:
the first search result part is exactly one of a uniform resource locator (URL), a hostname from the URL, a title, a snippet, a label, or a label histogram, and
the second search result part is exactly one of a URL, a hostname from the URL, a title, a snippet, a label, or a label histogram;
determining an interpretation of the query s from the individual search results, the interpretation being represented as a result classification of the result set as a whole, the result classification including a result category and a result score for the result set, wherein determining the result classification comprises:
for each of the plurality of individual search results:
determining, based on the first search result part:
a first search result part category for determining the interpretation of the query; and
a corresponding first search result part score; determining, based on the second search result part:
a second search result part category for determining the interpretation of the query; and
a corresponding second search result part score; and
determining an individual result category and a corresponding individual result score based on the first search result part category, the second search result part category, and a weighted combination of the first search result part score and second search result part score; and
determining the result category and the result score for the result set based on the individual result categories and corresponding individual result scores;
identifying, based on interpretation of the query as represented by the result classification, a page element that corresponds to the interpretation of the query; and
providing for display a page that includes the page element in addition to at least a portion of the result set"

and insert

-- 10. A system, comprising:
one or more computing devices configured to perform operations comprising:
receiving a result set, the result set including a plurality of individual search results of a query, each of the individual search results including a first search result part and a second search result part that is different from the first search result part, wherein:
the first search result part is exactly one of a uniform resource locator (URL), a hostname from the URL, a title, a snippet, a label, or a label histogram, and
the second search result part is exactly one of a URL, a hostname from the URL, a title, a snippet, a label, or a label histogram;
determining an interpretation of the query s from the individual search results, the interpretation being represented as a result classification of the result set as a whole, the result classification including a result category and a result score for the result set, wherein determining the result classification comprises:
for each of the plurality of individual search results:
determining, based on the first search result part:
a first search result part category for determining the interpretation of the query; and
a corresponding first search result part score;
determining, based on the second search result part:
a second search result part category for determining the interpretation of the query; and
a corresponding second search result part score; and
determining an individual result category and a corresponding individual result score based on the first search result part category, the second search result part category, and a weighted combination of the first search result part score and second search result part score; and
determining the result category and the result score for the result set based on the individual result categories and corresponding individual result scores;
identifying, based on interpretation of the query as represented by the result classification, a page element that corresponds to the interpretation of the query; and
providing for display a page that includes the page element in addition to at least a portion of the result set --.

In Claim 19, column 18, lines 9-11, delete

"19. A computer program product tangibly stored on a storage device, the product operable to cause a computing device to perform operations comprising:
receiving a result set, the result set including a plurality of individual search results of a query, each of the individual search results including a first search result part and a second search result part that is different from the first search result part, wherein:
the first search result part is exactly one of a uniform resource locator (URL), a hostname from the URL, a title, a snippet, a label, or a label histogram, and

CERTIFICATE OF CORRECTION (continued)
U.S. Pat. No. 8,103,676 B2 the second search result part is exactly one of a URL, a hostname from the URL, a title, a snippet, a label, or a label histogram;

determining an interpretation of the query from the individual search results, the interpretation being represented as a result classification of the result set as a whole, the result classification including a result category and a result score for the result set, wherein determining the result classification comprises:

for each of the plurality of individual search results:

determining, based on the first search result part:

a first search result part category for determining the interpretation of the query; and a corresponding first search result part score;

determining, based on the second search result part:

a second search result part category for determining the interpretation of the query; and a corresponding second search result part score; and determining an individual result category and a corresponding individual result score based on the first search result part category, the second search result part category, and a weighted combination of the first search result part score and second search result part score; and determining the result category and the result score for the result set based on the individual result categories and corresponding individual result scores;

identifying, based on the interpretation of the query as represented by the result classification, a page element that corresponds to the interpretation of the query; and providing for display a page that includes the page element in addition to at least a portion of the result set"

and insert

-- 19. A computer program product tangibly stored on a storage device, the product operable to cause a computing device to perform operations comprising:

receiving a result set, the result set including a plurality of individual search results of a query, each of the individual search results including a first search result part and a second search result part that is different from the first search result part, wherein:

the first search result part is exactly one of a uniform resource locator (URL), a hostname from the URL, a title, a snippet, a label, or a label histogram, and the second search result part is exactly one of a URL, a hostname from the URL, a title, a snippet, a label, or a label histogram;

determining an interpretation of the query from the individual search results, the interpretation being represented as a result classification of the result set as a whole, the result classification including a result category and a result score for the result set, wherein determining the result classification comprises:

for each of the plurality of individual search results:

determining, based on the first search result part:

a first search result part category for determining the interpretation of the query; and a corresponding first search result part score;
determining, based on the second search result part:
a second search result part category for determining the interpretation of the query; and
a corresponding second search result part score; and
determining an individual result category and a corresponding individual result score based on the first search result part category, the second search result part category, and a weighted combination of the first search result part score and second search result part score; and
determining the result category and the result score for the result set based on the individual result categories and corresponding individual result scores;
identifying, based on the interpretation of the query as represented by the result classification, a page element that corresponds to the interpretation of the query; and
providing for display a page that includes the page element in addition to at least a portion of the result set --.